(12) United States Patent
Lee

(10) Patent No.: US 9,514,736 B2
(45) Date of Patent: Dec. 6, 2016

(54) MOBILE TERMINAL AND CONTROL METHOD THEREOF

(71) Applicant: LG ELECTRONICS INC., Seoul (KR)

(72) Inventor: Junseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 283 days.

(21) Appl. No.: 14/276,912

(22) Filed: May 13, 2014

(65) Prior Publication Data

US 2015/0149180 A1 May 28, 2015

(30) Foreign Application Priority Data

Nov. 26, 2013 (KR) ........................ 10-2013-0144762

(51) Int. Cl.
*G06F 17/21* (2006.01)
*G10L 13/00* (2006.01)
*G06F 17/30* (2006.01)
*G06Q 10/10* (2012.01)

(52) U.S. Cl.
CPC ............ *G10L 13/00* (2013.01); *G06F 17/211* (2013.01); *G06F 17/30994* (2013.01); *G06Q 10/109* (2013.01)

(58) Field of Classification Search
CPC .. G10L 13/00; G06F 17/211; G06F 17/30994; G06F 10/109
See application file for complete search history.

(56) References Cited

U.S. PATENT DOCUMENTS

| | | | |
|---|---|---|---|
| 2004/0225635 A1* | 11/2004 | Toyama | G06F 17/30241 |
| 2006/0090141 A1* | 4/2006 | Loui | G06F 17/30064 715/764 |
| 2006/0148528 A1 | 7/2006 | Jung et al. | |
| 2009/0006965 A1* | 1/2009 | Bodin | G06F 17/30044 715/723 |
| 2009/0210793 A1* | 8/2009 | Yee | G06F 17/30265 715/723 |
| 2011/0167382 A1* | 7/2011 | van Os | G06Q 10/109 715/800 |
| 2012/0191716 A1* | 7/2012 | Omoigui | H01L 27/1463 707/740 |
| 2012/0210220 A1* | 8/2012 | Pendergast | G06F 3/0482 715/716 |

(Continued)

OTHER PUBLICATIONS

Yang, et al., "Visualizing Lifelong Data for Different Interaction Platforms," CHI 2013: Changing Perspectives, Paris, France, XP058016079, Apr. 2013, pp. 1785-1790.

(Continued)

*Primary Examiner* — Anil Bhargava
(74) *Attorney, Agent, or Firm* — Lee, Hong, Degerman, Kang & Waimey

(57) ABSTRACT

A mobile terminal and a control method of the mobile terminal are provided. The mobile terminal includes: a memory configured to store event information; and a controller configured to retrieve at least one event information entered for the time between specified points from the memory, create a frame screen for displaying the retrieved at least one event information and a notepad for storing at least one keyword extracted from each of the retrieved at least one event information contained in the frame screen, and create a diary by interfacing the frame screen with the notepad.

18 Claims, 34 Drawing Sheets

(56) References Cited

U.S. PATENT DOCUMENTS

2012/0311447 A1* 12/2012 Chisa .................. G06F 11/3082
715/719
2013/0145327 A1* 6/2013 Rinearson ............... G06F 3/017
715/863
2016/0034827 A1* 2/2016 Morris ................. G06Q 10/109
705/5

OTHER PUBLICATIONS

European Patent Office Application Serial No. 14175431.7, Search Report dated Mar. 31, 2015, 6 pages.

* cited by examiner

FIG. 4c

| trip to Jeju Island for 2 nights and 3 days | |
|---|---|
| start of trip to Jeju Island on 00, 00, 0000 | Oct. 2, 2013 |
| flight leaved on 00 | 07:20 |
| did search for map of Jeju Island | 10:10 |
| Seongsan Ilchulbong | 11:30 |
| accommodation for Day 1 | 13:50 |
| got to accommodation from airport | 14:10 |
| list of music I listened to on Day 1 | 15:20 |
| breakfast on Day 2, menu: 00 | 09:12 |
| top of Mt. Halla | 12:30 |
| uploaded photos of top of Mt. Halla to 00 | 12:50 |
| Witse Oreum, sunny day, temperature | 13:20 |
| recorded voice on top of Mt. Halla | 13:30 |
|  |  |
|  |  |

FIG. 5c

| Thur, Oct. 10 | |
|---|---|
| set alarm for 6:30 am | 06:30 |
| booked tickets for Now You See Me at OO theater on OO at OO | 09:20 |
| sent text message to husband that we will see | 09:25 |
| search a location of OO theater | 10:10 |
| baseball park | 14:00 |
| Lions vs. LG baseball game with score 2:4 | 17:20 |
| jogged 3.2 km in 25 mins 27 secs | 18:30 |
| bookmarked page 101 in XX e-book | 23:54 |
| set alarm for 7:00 am | 23:59 |

| Tue. Oct. 8 | ~151 |
| --- | --- |
| model development meeting | |
| sent mail to assistant manager Park 00. | |
| prepared seminar materials | |
| did search for places to eat | |
| 00 Restaurant in Gangnam | ~h1 |
| gym | |

（b）

| Tue. Oct. 8 | ~151 |
| --- | --- |
| model development meeting | |
| sent / mana | 00 Restaurant in Gangnam |
| prep | 1. History |
| did | |
| 00 R | 2. Go to content |
| gym | |

（c）

| 00 Restaurant in Gangnam | ~151 |
| --- | --- |
| Today | Dinner with 00 |
| Apr. 20 | Lunch with △△ |
| Jan. 2 | Lunch with 00 |

(a)   (b)

(a)

(b)

(a)

(b)

(a)

(b)

(c)

(d)

(e)

(f)

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2013-0144762, filed on 26 Nov., 2013, the contents of which are incorporated by reference herein in their entirety.

TECHNICAL FIELD

The present invention relates to a mobile terminal which creates a diary by collecting event information, and a control method thereof.

DISCUSSION OF THE RELATED ART

As the functions of terminals, such as personal computers, laptops, mobile phones, etc., have become diversified, terminals are implemented in the form of a multimedia player having comprehensive functions such as capturing still and video images, playing back music or video files, playing games, receiving broadcasts, and the like.

A terminal can generate and store numerous data associated with various functions. For example, they are able to manage various types of data, including log data such as outgoing and incoming calls and sent and received messages, data such as schedules or memos saved by the user, and multimedia data such as images, videos, or sounds.

As data managed by terminals increases, there is growing demand to process and provide such data the way the user wants.

SUMMARY

The present invention has been made in an effort to provide a mobile terminal which creates a diary from data about events collected for the time between specified points and extracts text contained in the created diary and outputs it as voice, and a control method thereof.

One embodiment of the present invention provides a mobile terminal including: a memory configured to store event information; and a controller configured to retrieve at least one event information entered for the time between specified points from the memory, create a frame screen for displaying the retrieved at least one event information and a notepad for storing at least one keyword extracted from each of the retrieved event information included in the frame screen, and create a diary by interfacing the frame screen with the notepad.

The mobile terminal may further include a touch screen, and the controller may be configured to display the frame screen on the touch screen, convert the keywords stored in the notepad into voice, and output the voice, upon receiving an input for playing the diary.

The controller may be configured to output music in the music playlist as background music while converting the keywords stored in the notepad into voice and outputting the voice, if a music playlist is contained in the retrieved at least one event information in the diary.

The controller may be configured to display on the touch screen a navigation bar including an indicator indicating the total playback time of the keywords stored in the notepad and the current playback position.

The controller may be configured to highlight a portion of the event information corresponding to the keyword for the current playback position.

The mobile terminal may further include a touch screen, and the controller may be configured to display the notepad on the touch screen, convert the keywords stored in the notepad into voice, and output the voice, upon receiving an input for playing the diary.

The controller may be configured to display a first navigation bar on the touch screen in a first direction to correspond to a keyword and a second navigation bar on the touch screen in a second direction, the first navigation bar including at least one icon for retrieving the keywords stored in the memory and detailed information about the keywords, and the second navigation bar including an indicator indicating the total playback time of the keywords stored in the notepad and the current playback position.

The controller may be configured, upon receiving an input on a particular icon included in the first navigation bar, to display detailed information about the keyword corresponding to the particular icon below the keyword display area.

The controller may be configured to display detailed information about a keyword corresponding to the currently playing voice below the keyword display area, upon receiving an input on the indicator included in the second navigation bar and indicating the current playback position.

Event information may include at least one of the following: an incoming phone call, the receipt of a message, an incoming mail, the receipt of a notification, a search using an application, information storage, information entry, and a change in the terminal's location information by more than a certain amount.

The controller may be configured, upon receiving an event, to include the receipt time of the event and the terminal location information at the time of receipt of the event in the event information and store the same.

The controller may be configured to select a representative image from among at least one event information contained in the frame screen and a representative keyword from among at least one keyword stored in the notepad, display the representative keyword on the representative image, and store the representative keyword and the representative image as a representative thumbnail of the diary.

The mobile terminal may further include a touch screen, and the controller may be configured, upon receiving an input for retrieving among a plurality of created diaries, to display reduced-size representative thumbnails or files of the diaries, to render the representative thumbnail or file of the diary displayed in the center of the touch screen larger than the representative thumbnails or files of the other diaries, and, upon receiving a drag input in a particular direction on the touch screen, to move the representative thumbnails or files of the diaries in the drag direction for display.

The mobile terminal may further include a touch screen, and the controller may be configured, upon receiving an input for retrieving among a plurality of created diaries, to display a scrollbar in a first area of the touch screen and reduced-size representative thumbnails or files of the diaries in a second area of the touch screen, upon receiving an input on the scrollbar, to move the reduced-size representative thumbnails or files of the diaries in the scroll direction for display, and to render the representative thumbnail or file of the diary displayed at the input position on the scrollbar relatively large.

The mobile terminal may further include a touch screen, and the controller may be configured, upon receiving an input for retrieving among a plurality of created diaries, to display reduced-size representative thumbnails of the diaries in a first area of the touch screen and a frame screen displaying at least one event information of a particular diary in a second area of the touch screen.

The controller may be configured to display an indicator for the particular keyword if the controller has a history stored therein, corresponding to a particular keyword contained in the notepad, and display a dialog pop-up containing history information, upon receiving an input on the indicator.

The controller may be configured to display at least one event information on the frame screen in chronologic order.

Another embodiment of the present invention provides a control method of a mobile terminal, the control method including: retrieving at least one event information entered for the time between specified points; creating a frame screen for displaying at least one event information; extracting at least one keyword from each of event information contained in the frame screen; creating a notepad for storing the at least one extracted keyword; and creating a diary by interfacing the frame screen with the notepad.

The control method of the mobile terminal may further include: receiving an input for playing a created diary; and converting the keywords stored in the notepad into voice and outputting the same while displaying the frame screen.

The control method of the mobile terminal may further include: receiving an input for playing the created diary; and converting the keywords stored in the notepad into voice and outputting the same while displaying the notepad.

The details of other embodiments are contained in the detailed description and accompanying drawings.

The mobile terminal and the control method of the mobile terminal according to the present invention have the following advantages.

According to one embodiment of the present invention, events entered into the mobile terminal for a set period of time can be automatically created and kept as a diary, and information about other events related to a particular event can be provided.

According to one embodiment of the present invention, keywords for images extracted in text format, as well as text contained in a created diary, can be created as a diary in notepad form, and the diary can be played in voice.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 4a to 4c are views for explaining a method of creating a diary in a mobile terminal according to a first embodiment of the present invention;

FIGS. 5a to 5c are views for explaining a method of creating a diary in a mobile terminal according to a second embodiment of the present invention;

FIGS. 8 and 9 are views for explaining a user interface that displays a notepad contained in a diary created in a mobile terminal according to one embodiment of the present invention.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
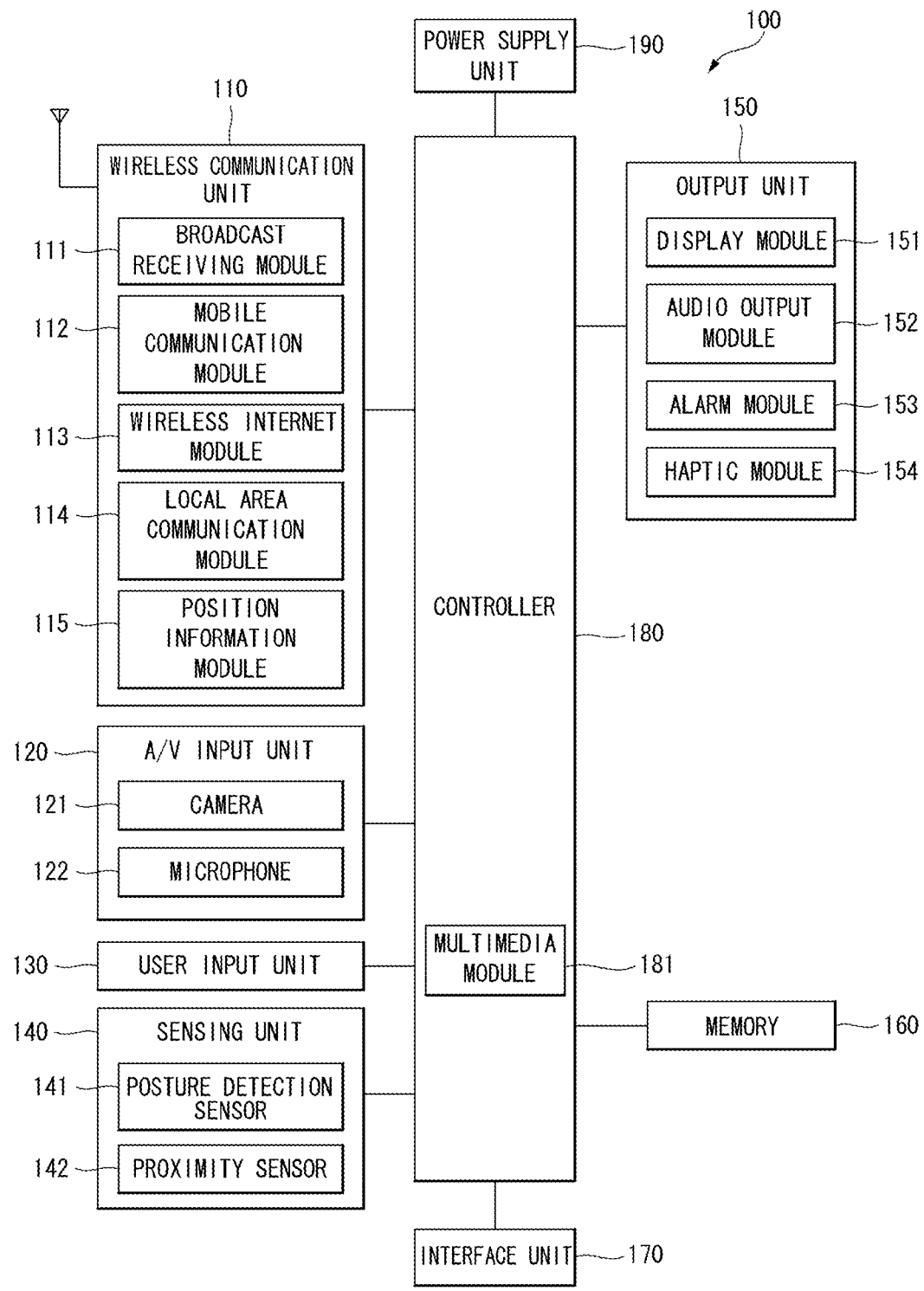
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply unit 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display module 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply unit 190 supplies power and/or whether the interface 170 is connected to an external device. The sensing unit 140 may also include a proximity sensor. The sensing unit 140 may sense a motion of the mobile terminal 100.

The output unit 150 may generate visual, auditory and/or tactile output, and the output unit 150 may include the display module 151, an audio output module 152, an alarm 153 and a haptic module 154. The display module 151 may display information processed by the mobile terminal 100. The display module 151 may display a user interface (UI) and/or a graphic user interface (GUI) related to a telephone call when the mobile terminal 100 is in the call mode. The display module 151 may also display a captured and/or received image, a UI or a GUI when the mobile terminal 100 is in the video telephony mode or the photographing mode.

The display module 151 may include at least one of a liquid crystal display, a thin film transistor liquid crystal display, an organic light-emitting diode display, a flexible display and/or a three-dimensional display. The display module 151 may be of a transparent type or a light transmissive type. That is, the display module 151 may include a transparent display.

The transparent display may be a transparent liquid crystal display. A rear structure of the display module 151 may also be of a light transmissive type. Accordingly, a user may see an object located behind the body (of the mobile terminal 100) through the transparent area of the body of the mobile terminal 100 that is occupied by the display module 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display module 151 and a sensor sensing touch (hereafter referred to as a touch sensor) form a layered structure that is referred to as a touch screen, the display module 151 may be used as an input device in addition to an output device. The touch sensor may be in the form of a touch film, a touch sheet, and/or a touch pad, for example.

The touch sensor may convert a variation in pressure applied to a specific portion of the display module 151 or a variation in capacitance generated at a specific portion of the display module 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor (of the sensing unit 140) may be located in an internal region of the mobile terminal 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display module 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply unit 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
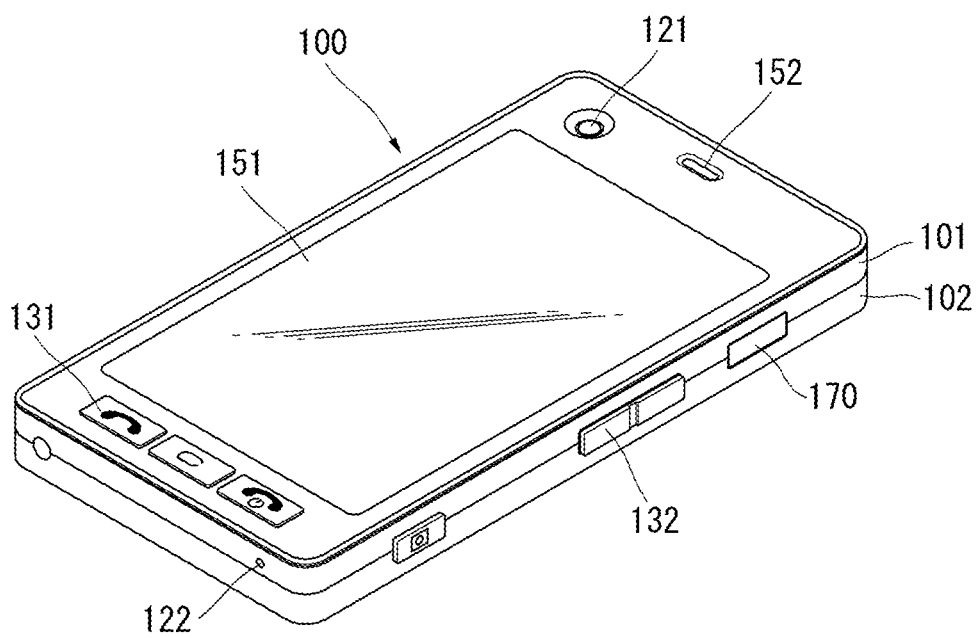
FIG. 2A is a front perspective view of the mobile terminal according to an embodiment.

FIG. 2A is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display module 151, the audio output unit 152, the camera 121, the user input unit 130/131 and 132, the microphone 122 and the interface 170 may be arranged (or provided) in the terminal body, and more specifically may be arranged (or provided) in the front case 101.

The display module 151 may occupy most of the main face of the front case 101. The audio output unit 152 and the camera 121 may be arranged in a region in proximity to one of both ends of the display module 151 and the user input unit 131, and the microphone 122 may be located in a region in proximity to another end of the display module 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display module 151 to a touch recognition mode.

Figure 2B:
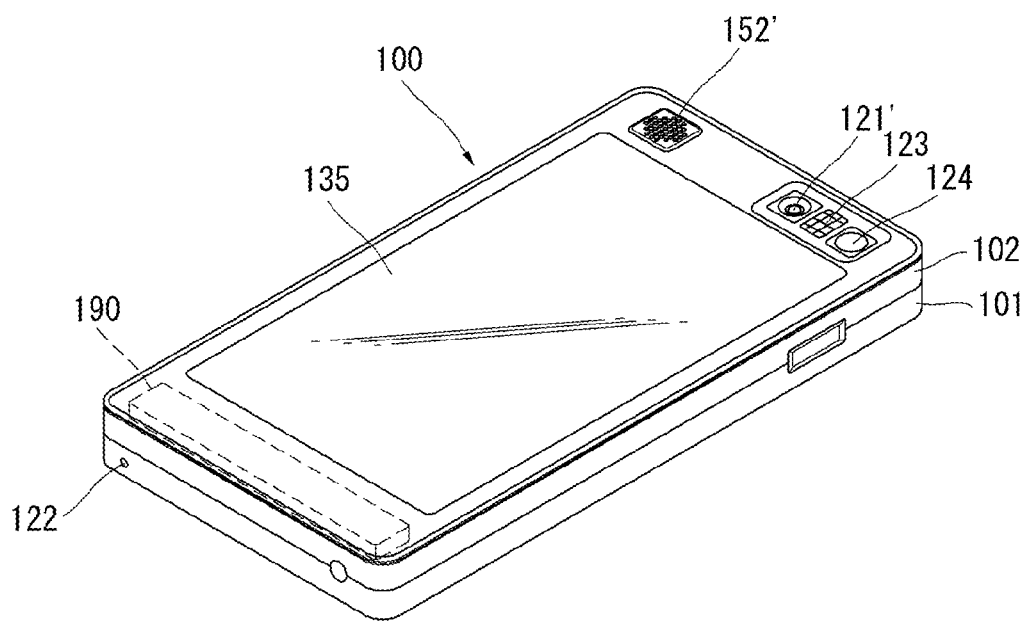
FIG. 2B is a rear perspective view of the mobile terminal according to an embodiment.

FIG. 2B is a rear perspective view of the mobile terminal (shown in FIG. 2A) according to an embodiment.

Referring to FIG. 2A, a camera 121' may be additionally attached to the rear side of the terminal body (i.e., the rear case 102). The camera 121' may have a photographing direction opposite to that of the camera 121 (shown in FIG. 2A) and may have pixels different from those of the camera 121 (shown in FIG. 2A).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2A) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply unit 190 for providing power to the mobile terminal 100 may be set in the terminal body. The power supply unit 190 may be included in the terminal body or may be detachably attached to the terminal body.

A touch pad 135 for sensing touch may be attached to the rear case 102. The touch pad 135 may be of a light transmission type, such as the display module 151. In this example, if the display module 151 outputs visual information through both sides thereof, the visual information may be recognized (or determined) by the touch pad 135. The information output through both sides of the display module 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display module 151 of the front case 101. The touch pad 135 may be located in parallel with the display module 151 behind the display module 151. The touch panel 135 may be identical to or smaller than the display module 151 in size.

Hereinafter, embodiments of the present invention will be described in detail.

Figure 3:
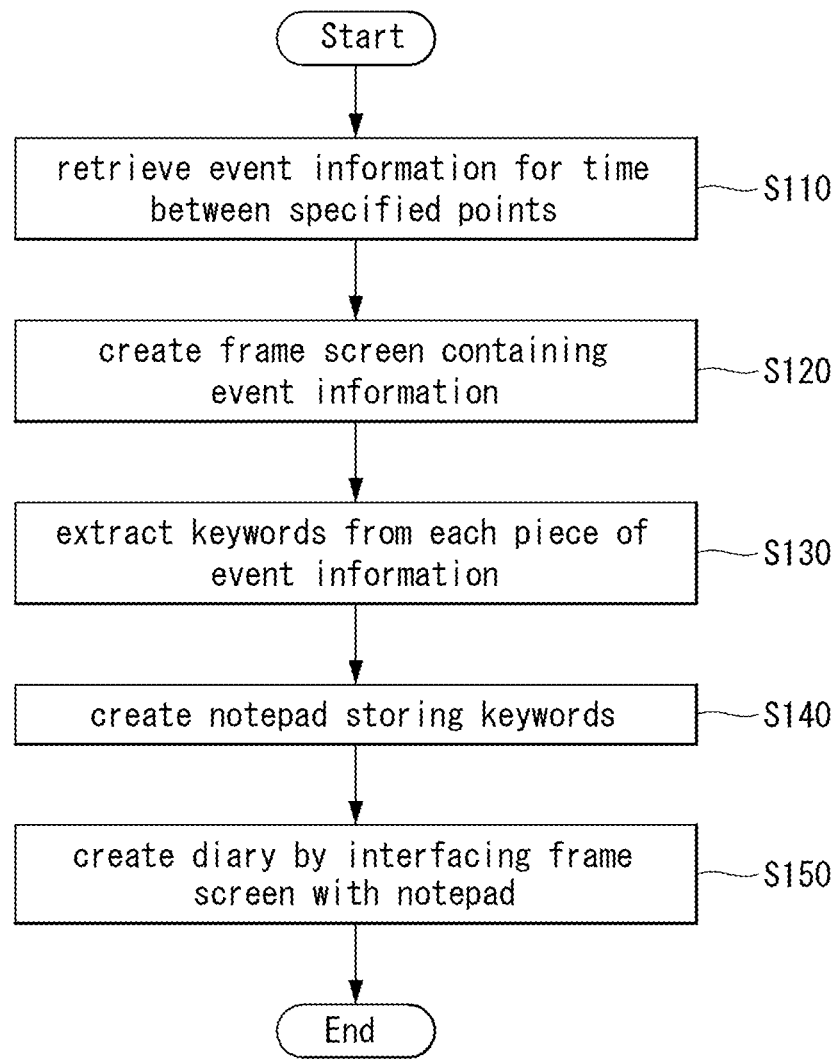
FIG. 3 is a flowchart of a control method of a mobile terminal according to an embodiment of the present invention.

FIG. 3 is a flowchart of a control method of a mobile terminal according to an embodiment of the present invention.

Referring to FIG. 3, the controller (180 of FIG. 1) may retrieve event information for the time between specified points (S110). The controller (180 of FIG. 1) may store in the memory (160 of FIG. 1) log data about at least one event entry such as a phone call, the receipt of a message, the execution of a particular application, or a notification. In this case, the controller (180 of FIG. 1) may store the event information entry time and terminal location information that are matched to each of event information.

The controller (180 of FIG. 1) may create a frame screen containing event information (S120). The event information may be extracted in text format or image format, and text size or image size may be automatically adjusted depending on the size of the frame screen. As used herein, the frame screen is defined as a particular screen containing event information in text or image format, which may not necessarily include a frame surrounding the particular screen. The event information contained in the frame screen may include multiple pieces of log data such as event entry time, terminal location information at the time of event entry, and other thumbnail information, and the controller (180 of FIG. 1) may display only representative log data on the frame screen and display the other log data upon a request for detailed information. The controller may arrange each piece of event information in chronologic order on the frame screen.

The controller (180 of FIG. 1) may extract keywords from each piece of event information (S130), and create a notepad storing the extracted keywords (S140). The controller (180 of FIG. 10 may extract the representative log data as a keyword or extract the multiple pieces of log data as individual keywords. For example, in case of event information displayed in image format, the controller may extract thumbnail information of the image as a keyword (S140).

The controller may create a notepad storing extracted keywords, the notepad including all the keywords extracted from event information for the time between specified points, and may store the keywords extracted from each piece of event information, in connection with the event entry time. Also, the controller may store a keyword, such as a place-related keyword, an anniversary-related keyword, etc, which may include a history, in connection with an icon for retrieving previous history information.

The controller (180 of FIG. 1) may create a diary containing at least one piece of event information for the time between specified points by interfacing the created frame screen with the created notepad (S150). The controller may create a diary containing event information for the time between specified points entered by the user, and, if a diary creation cycle is set, may create a diary for each set cycle.

The controller (180 of FIG. 1) may set a representative image and a representative keyword for the created diary. The controller may set a representative image by the user's selecting one of the images contained in the diary. Also, the controller may select the first image contained the created diary as the representative image, or set the representative image by taking the number of views or the number of uses in other applications (e.g., uploading photos from a gallery to SNS) into account. The controller may select, as the representative keyword, an entry in a schedule on a calendar application, the place and date of image capture, or a keyword the user saved as the representative keyword.

Upon receiving a request for executing the created diary, the controller (180 of FIG. 1) may display a frame screen and a playback navigation bar on the touch screen. Upon receiving an input for playing the diary through the playback navigation bar, the controller (180 of FIG. 1) may convert the keywords stored in the notepad interfacing with the frame screen into voice and output it, and display the total playback time of the notepad and the current playback position by using an indicator on the playback navigation bar. Upon receiving a drag input on the indicator on the playback navigation bar, the controller may adjust and display the indicator's position on the playback navigation bar in response to the drag input, and output a keyword for the indicator's position as voice. In this case, the controller may display the event information corresponding to the keyword displayed on the frame screen in a different way from other event information. For example, the outline of the event information corresponding to the keyword may be highlighted, or the tone of the event information may be rendered lighter or darker. Upon receiving an input for playing the diary, and if a music playlist is contained in the event information in the diary, the controller may output music in the music playlist as background music while converting the keywords stored in the notepad into voice and outputting the voice.

Upon receiving a request for executing the created diary, the controller (180 of FIG. 1) may display the notepad, a first playback navigation bar, and a second playback navigation bar on the touch screen. The first navigation bar may include an indicator indicating the position of the representative keyword for the notepad and an indicator indicating the current playback position, and the second playback navigation bar may include an indicator indicating the total playback time of the notepad and the current playback position. Upon receiving an input on the indicator indicating the current playback position on the first playback navigation bar, the controller may display detailed information about an event related to the keyword for the current playback position on the touch screen. If the input on the indicator indicating the current playback position on the first playback navigation bar is released, the controller may release the display of the detailed information about the event. Also, upon receiving an input on the indicator indicating the current playback position on the second playback navigation bar, the controller may display detailed information about an event related to the keyword for the current playback position on the touch screen. If the input on the indicator indicating the current playback position on the second playback navigation bar is released, the controller may release the display of the detailed information about the event. The input on the indicator indicating the current playback position may be a long press or a double touch. Also, upon receiving a drag input on the indicator indicating the current playback position on the second playback navigation bar, the controller may output a keyword for the drag position as voice, and adjust and display the position of the indicator indicating the current playback position on the first playback navigation bar.

The controller (180 of FIG. 1) may select a representative image from among at least one piece of event information contained in the frame screen and a representative keyword from among at least one keyword stored in the notepad, and display the representative keyword on the representative image and store the representative keyword and the representative image as a representative thumbnail of the diary.

Upon receiving an input for retrieving a particular one of a plurality of diaries, the controller (180 of FIG. 1) may reduce representative thumbnails or files of the diaries and display them on the touch screen, and render the representative thumbnail or file of the diary displayed in the center of the touch screen larger than the representative thumbnails or files of the other diaries. Also, upon receiving a drag input in a particular direction on the touch screen, the controller may move the representative thumbnails or files of the diaries in the drag direction and display them, and then render the representative thumbnail or file of the diary displayed in the center of the touch screen larger than the representative thumbnails or files of the other diaries.

Upon receiving an input for retrieving a particular one of a plurality of diaries, the controller (180 of FIG. 1) may display a scrollbar in a first area of the touch screen, and reduce representative thumbnails of the diaries and display them in a second area of the touch screen. Upon receiving an input on the scrollbar, the controller may move the reduced-size representative thumbnails of the diaries in the scroll direction and display them, and render the representative thumbnail of the diary displayed at the input position on the scrollbar relatively large.

Hereinafter, a method of creating a diary in a mobile terminal according to one embodiment of the present invention will be described with reference to FIGS. 4a to 9.

Figure 4A:
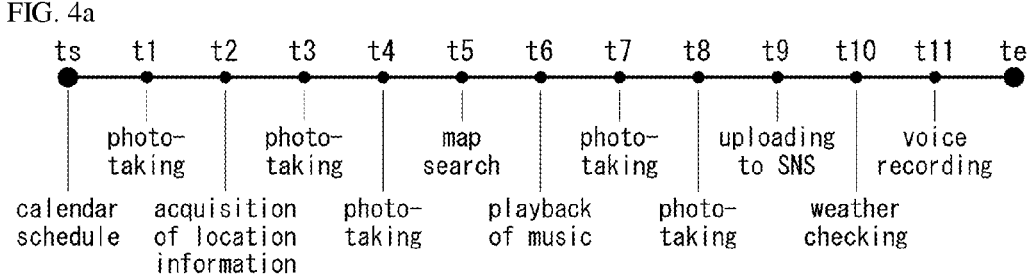
Figure 4B:
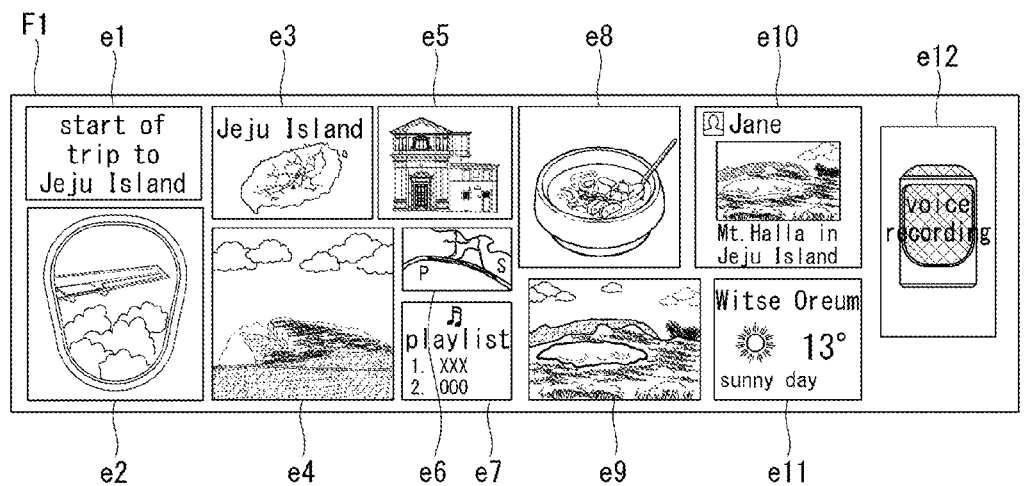
Figure 5A:
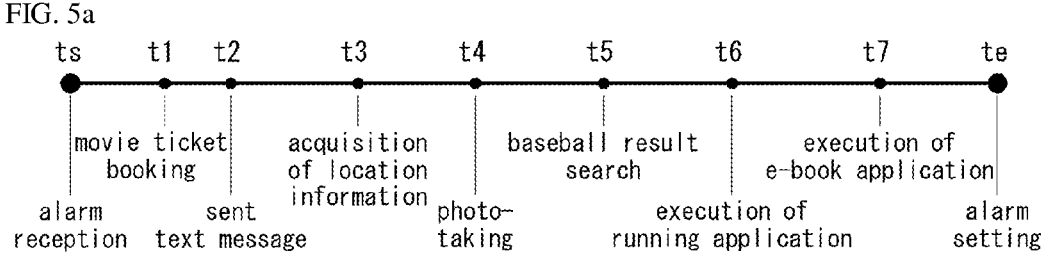
Figure 5B:
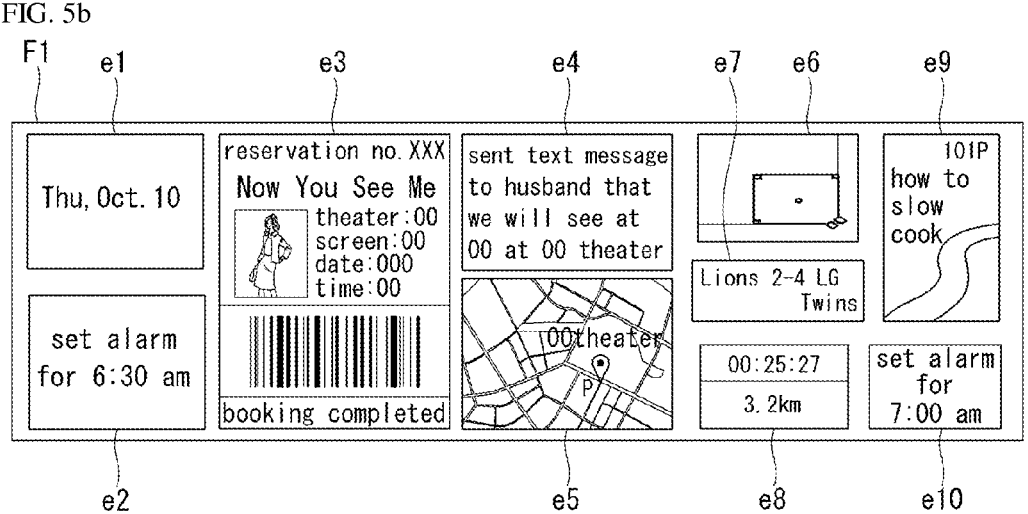

FIGS. 4a to 4c are views for explaining a method of creating a diary in a mobile terminal according to a first embodiment of the present invention. FIGS. 5a to 5c are views for explaining a method of creating a diary in a mobile terminal according to a second embodiment of the present invention.

First, the first embodiment for creating a diary of a trip to Jeju Island for 2 nights and 3 days will be described with reference to FIGS. 4a to 4c.

Referring to FIG. 4a, the controller (180 of FIG. 1) may retrieve event information between two specified points ts and te.

The controller may store event entry time, event information, and terminal location information in the memory when entering an event in the mobile terminal, and, when two specified points ts and te are selected, retrieve event information between the specified points ts and te.

Specifically, if schedule information is stored in a calendar application related to the point ts, a photo-taking event occurs at the points t1, t3, t4, t7, and t8, an event that makes a sudden change in the terminal's location information occurs at the point t2, a map search application is executed at the point t5, a music play application is executed at the point t6, a particular SNS application is executed at the point t6, a weather widget is used at the point t10, and a voice recording application is executed at the point t11, the controller may store each piece of event information in the memory, along with time information and location information.

The controller may retrieve the event information entered in the mobile terminal between the specified points ts and te.

Referring to FIG. 4b, the controller may arrange representative text or images for each piece of event information on the frame screen in chronologic order.

Specifically, the controller may display schedule information 'start of trip to Jeju Island e1' stored in the calendar application related to the point ts as first event information on the frame screen F1, and display a captured image e2 for the point t1 as second event information on the frame screen F1. Likewise, the controller may arrange the event information e3 through e12 that occurred between the points t2 and to on the frame screen F1 in chronologic order. In this case, the controller may extract each piece of event information e1 through e12 in text format or image format, and enlarge or reduce it for display, considering the size of the frame screen F1.

Referring to FIG. 4c, the controller (180 of FIG. 1) may extract at least one keyword from each piece of event information contained in the frame screen and store it in the notepad.

The controller may extract entered or stored text, a thumbnail of an image, or the entry time and place of each event as a keyword.

Specifically, the controller may extract 'start of trip to Jeju Island on 00, 00, 0000' as a keyword from the first event information e1, extract 'flight leaved at 00' as a keyword from the second event information e2, and extract 'Did search for map of Jejus Island' as a keyword' from the third event information e3. Likewise, the controller may extract keywords from the fourth to twelfth event information e4 to e12, and store them in the notepad.

The controller may display the entry time of event information for a keyword, along with the keyword, in the notepad due to the nature of a diary, extract at least one keyword from one piece of event information, and divide a plurality of keywords extracted from the piece of event information into main keywords and sub-keywords.

The controller may create a diary by interfacing the frame screen (F1, see FIG. 4b) with the notepad (see FIG. 4c).

Next, the second embodiment for creating a diary for Thursday, October 10 will be described with reference to FIGS. 5a to 5c.

Referring to FIG. 5a, the controller (180 of FIG. 1) may retrieve event information between two specified points ts and te.

The controller may store event entry time, event information, and terminal location information in the memory when entering an event in the mobile terminal, and when two specified points ts and te are selected, retrieve event information between the specified points ts and te.

Specifically, if an alarm reception event occurs at the point ts, a movie ticket booking application is executed at the point t1, a text message sending event occurs at the point t2, the terminal's location information is changed at the point t3, a photo-taking application is executed at the point t4, a baseball result search application is executed at the point t5, a running application is executed at the point t6, and an e-book application is executed at the point t7, and an alarm setting event occurs at the point te, the controller may store each piece of event information, time, and location information in the memory.

The controller may retrieve the event information entered in the mobile terminal between the specified points ts and te.

Referring to FIG. 5b, the controller may arrange representative text or images for each piece of event information on the frame screen in chronologic order.

Specifically, the controller may display 'Thursday, October 10 e1' and 'set alarm for 6:30 am e2' for the alarm reception event related to the point ts as first event information and second event information, respectively, on the frame screen F1, and display the execution result e3 of the movie ticket booking application for the point t1 as third event information on the frame screen F1. Likewise, the controller may arrange the event information e4 through e10 that occurred between the points t2 and te on the frame screen F1 in chronologic order. In this case, the controller may extract each piece of event information e1 through e10 in text format or image format, and enlarge or reduce it for display, considering the size of the frame screen F1.

The controller may select a representative keyword and a representative image for the time between specified points ts and te as the first event information. Normally, schedule information on the calendar and date information may be selected as the first event information.

Referring to FIG. 4c, the controller (180 of FIG. 1) may extract at least one keyword from each piece of event information contained in the frame screen and store it in the notepad.

Specifically, the controller may extract 'Thursday, October 10' as a keyword from the first event information e1, extract 'set alarm for 6:30 am e2' as a keyword from the second event information e2, and extract 'booked tickets for Now You See Me' as a keyword from the third event information e3. Likewise, the controller may extract keywords from the fourth to twelfth event information e4 to e10, and store them in the notepad.

The controller may display the entry time of event information for a keyword, along with the keyword, in the notepad due to the nature of a diary, extract at least one keyword from one piece of event information, such as the third event information, and divide a plurality of keywords extracted from the piece of event information into main keywords ('booked tickets for Now You See Me') and sub-keywords (00 movie theater, at 00 on 00).

FIGS. 6a to 6h are views for explaining event information entered in a mobile terminal according to one embodiment of the present invention.

Referring to FIGS. 6a to 6h, if an event received by the mobile terminal involves the user's executing a particular application or entering/saving particular information, the controller (180 of FIG. 1) may extract event information and store it in the memory.

Figure 6A:
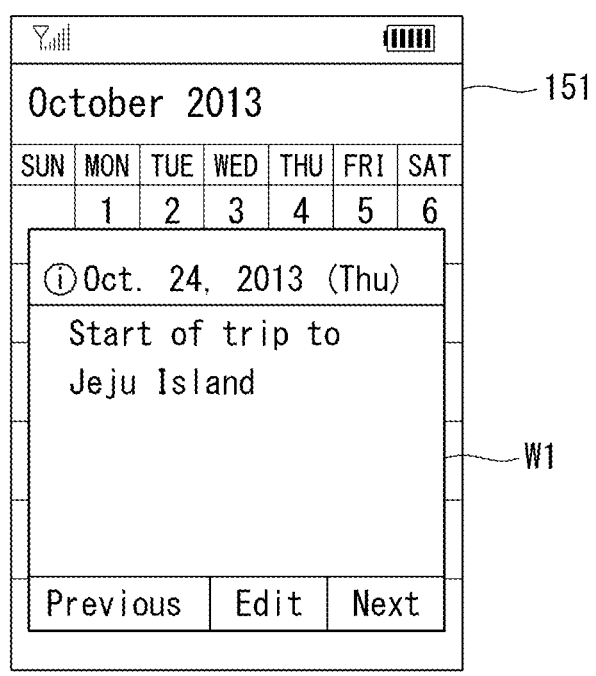
FIGS. 6a to 6h are views for explaining event information entered in a mobile terminal according to one embodiment of the present invention.

Specifically, referring to FIG. 6a, if schedule information is stored in the calendar application, the controller may event information 'start of trip to Jeju Island on Oct. 24, 2013'.

Figure 6B:
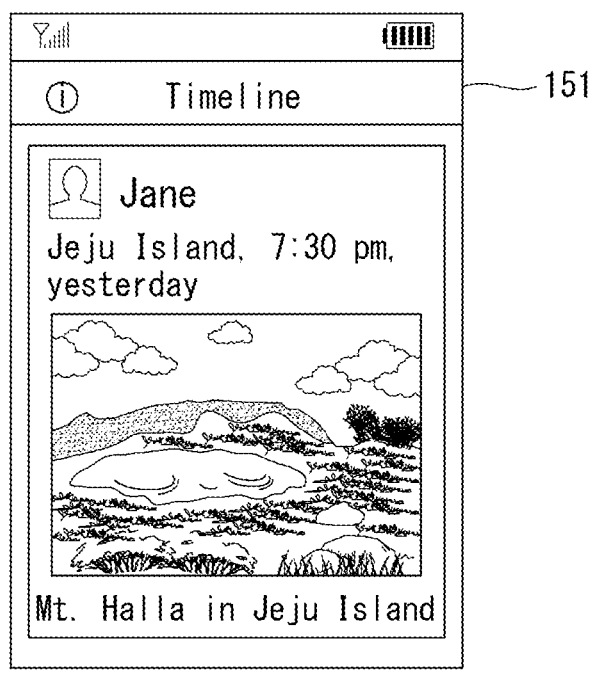

Referring to FIG. 6b, if an SNS (social networking service) is executed and a post is uploaded to the timeline, the controller may extract a captured image of the execution result screen as event information.

Figure 6C:
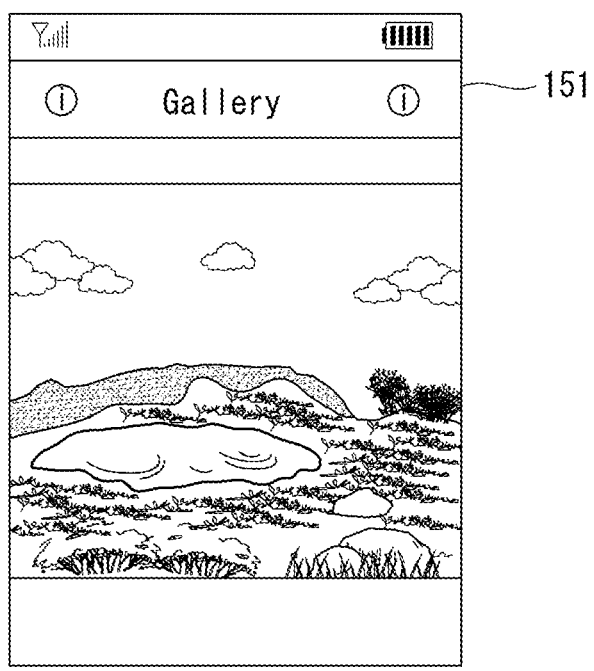
Figure 6D:
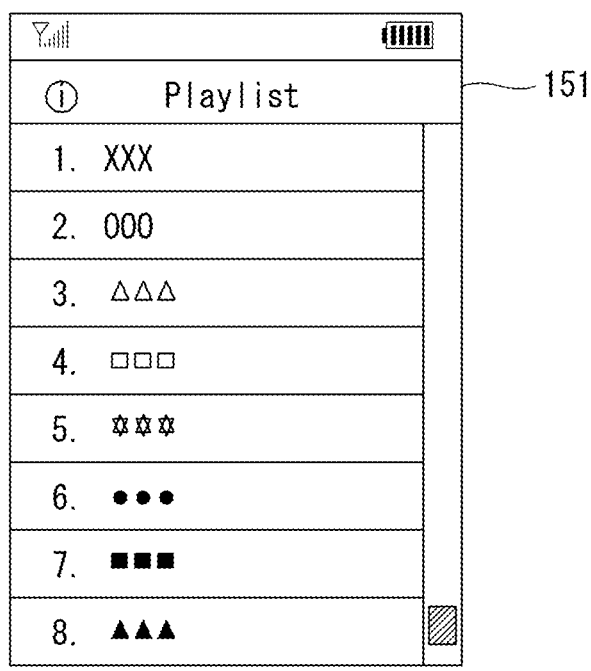

Referring to FIG. 6c, if a photo-taking event occurs, the controller may extract a captured image as event information, and referring to FIG. 6d, if a music playback event occurs, the controller may extract a playlist of music as event information.

Figure 6E:
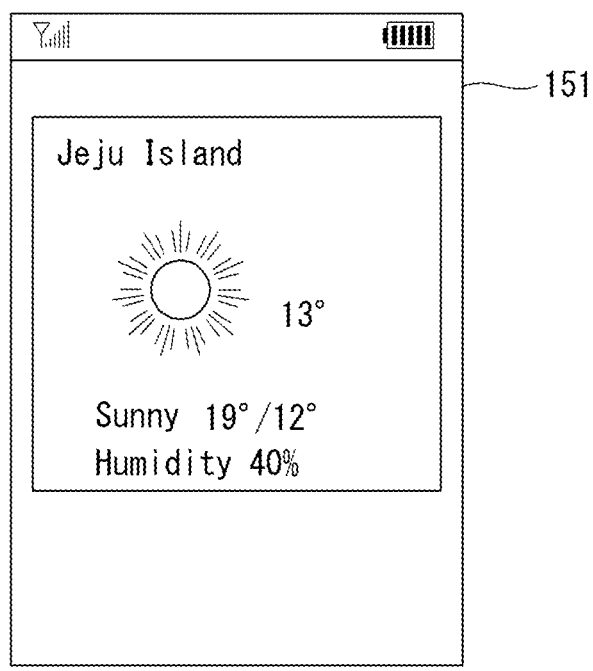
Figure 6F:
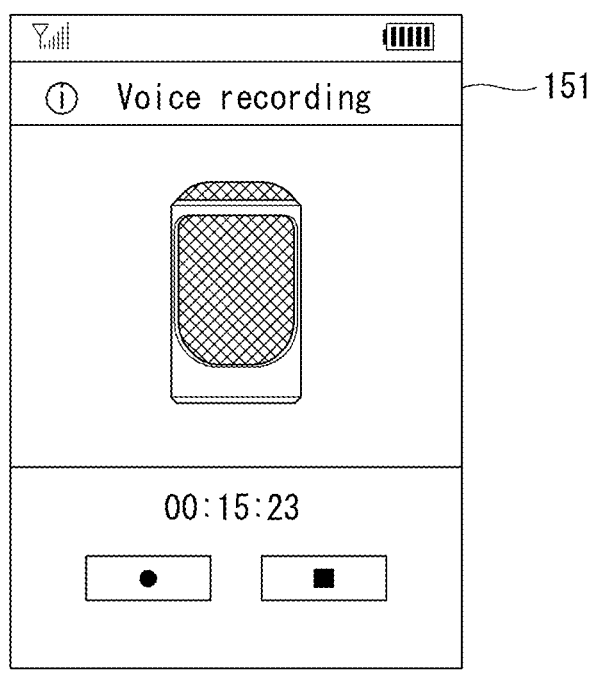

Referring to FIG. 6e, if the weather widget is executed to check the weather in a place, the controller may extract a captured image of the weather widget for the place as event information, and referring to FIG. 6f, if a voice recording application is executed, the controller may extract a voice record or a captured image of the execution screen of the voice recording application as event information.

Figure 6G:
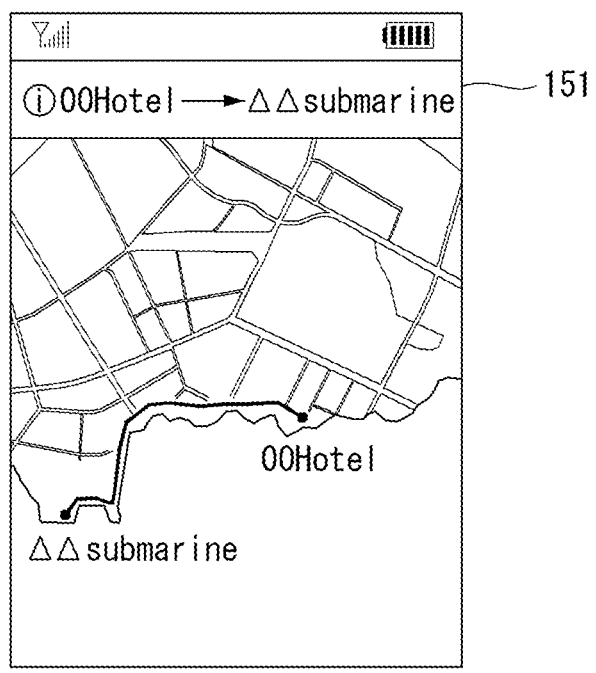
Figure 6H:
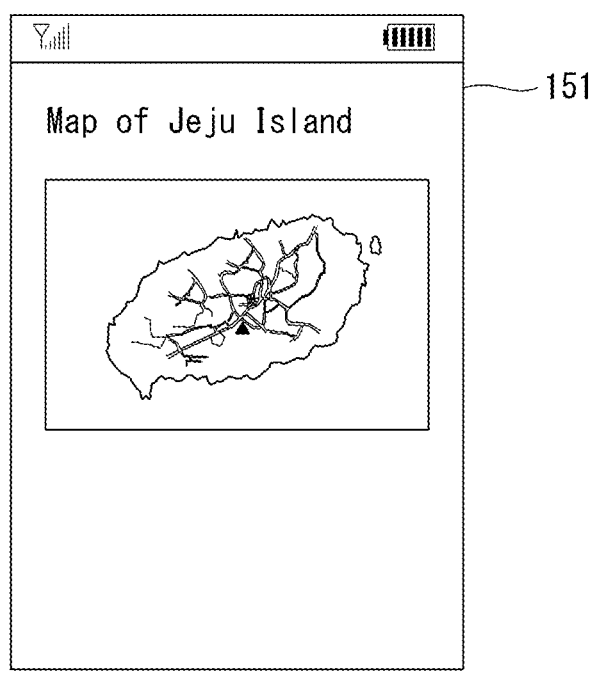

Referring to FIG. 6g, if a pathfinding application is executed to find a path, the controller may extract the execution screen displaying the path as event information, and referring to FIG. 6h, if a search application is executed to do a search with a particular keyword, the controller may extract the search result screen as event information.

In addition to the event information illustrated in FIGS. 6a to 6g, an image or text of the execution result screen of a particular application, information related to a sent or received event, a written email, alarm reception information, a search word, a search result, etc may be extracted as event information.

Figure 7A:
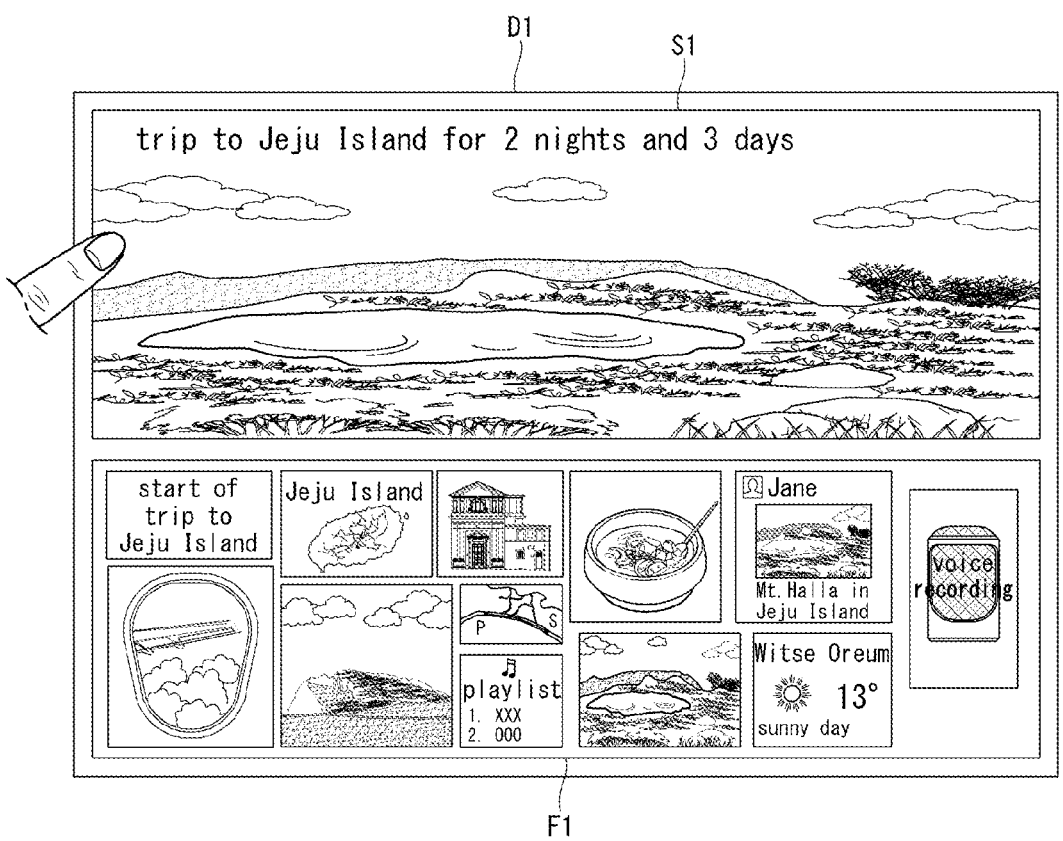
FIGS. 7a to 7c are views for explaining a method of creating a diary for which a representative image and a representative keyword are set, in a mobile terminal according to one embodiment of the present invention.
Figure 7B:
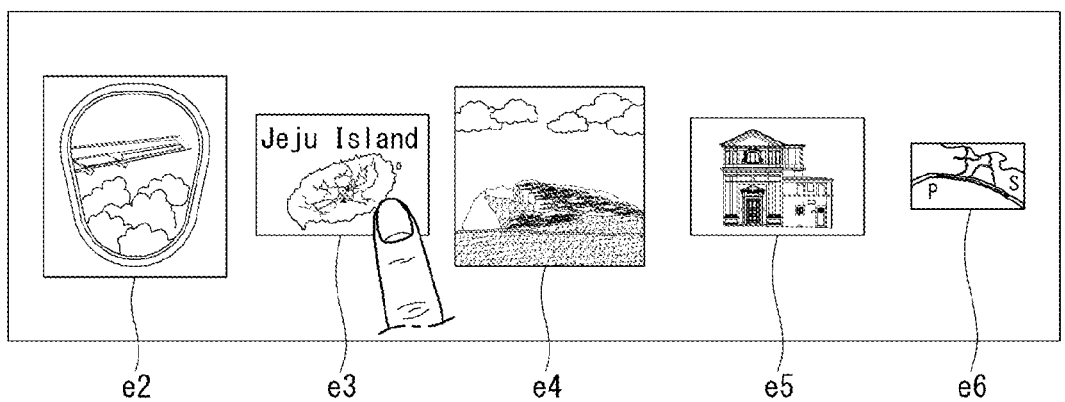
Figure 7C:
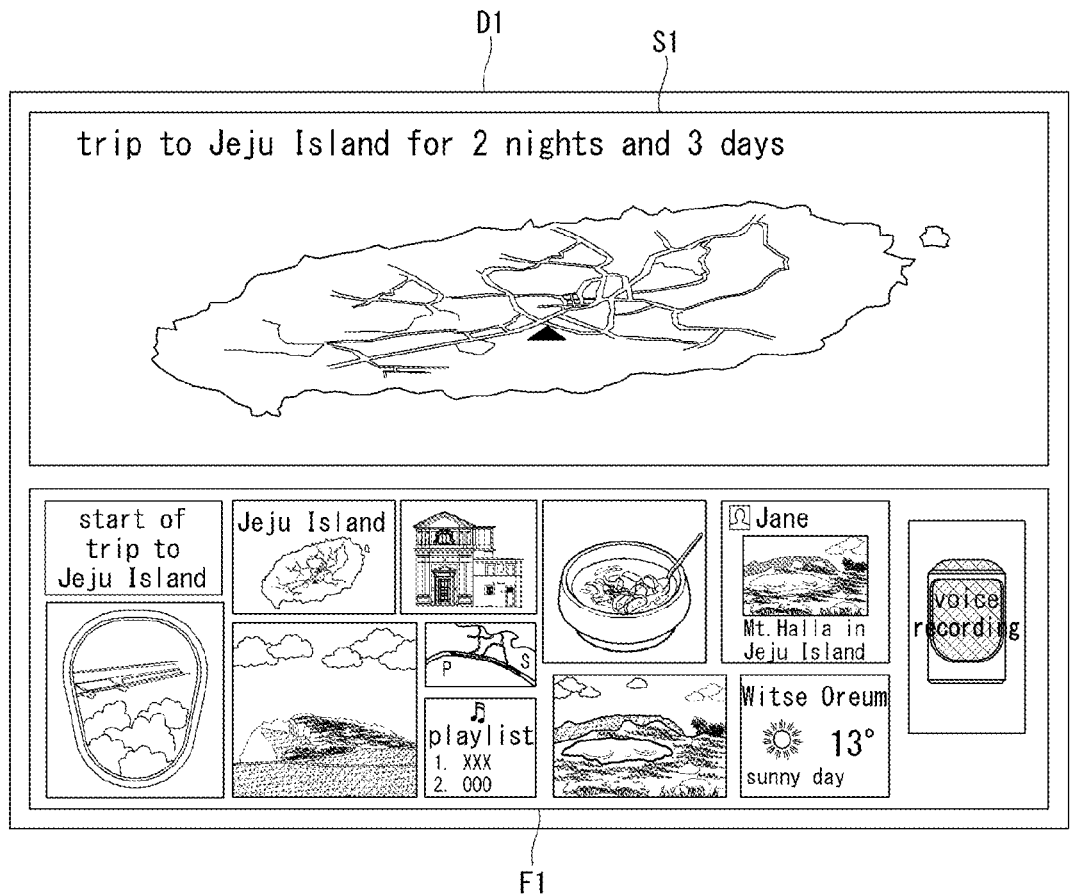

FIGS. 7a to 7c are views for explaining a method of creating a diary for which a representative image and a representative keyword are set, in a mobile terminal according to one embodiment of the present invention.

Referring to FIGS. 7a to 7c, the controller (180 of FIG. 1) may determine a representative image and a representative keyword for each diary, and select the representative image and the representative keyword as a representative thumbnail of the diary.

Once a representative thumbnail is set, the controller may create the representative thumbnail S1 and the frame screen F1 as a file D1 and store the file D1.

Referring to FIG. b, upon receiving an input on the representative thumbnail, the controller may display all the images contained in the frame screen F1, and modify the representative thumbnail by changing the representative image to a different image contained in the frame screen F1.

Referring to FIG. 7c, once the representative thumbnail is modified, the controller may re-create the modified representative thumbnail S1 and the frame screen F1 as a file D1 and store the file D1.

The representative image and the representative keyword may be determined by the user's selection, or by selecting the first image or the most frequently used image as the representative image and selecting time information, place information, or an entry stored in the schedule as the representative keyword.

Although not shown, the representative keyword for a diary for which a representative thumbnail is set also can be modified on the edit screen.

Figure 8:
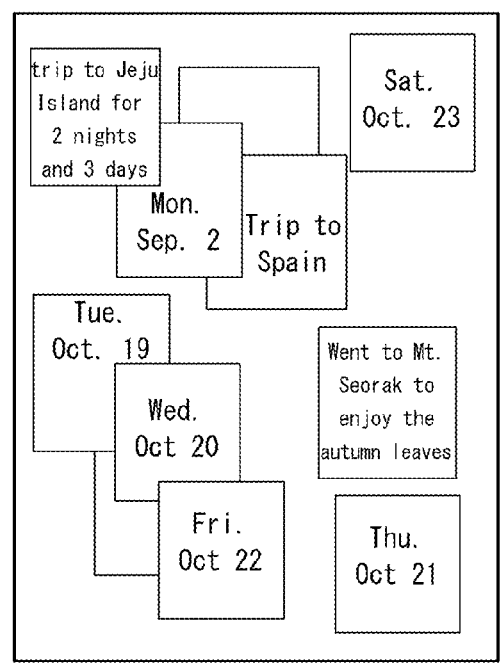

FIGS. 8 and 9 are views for explaining a user interface that displays a notepad contained in a diary created in a mobile terminal according to one embodiment of the present invention.

Referring to FIG. 8, the controller (180 of FIG. 1) may display a list of representative keywords for the notepads contained in a plurality of created diaries (see (a) of FIG. 8), or display a user interface where post-its, each with a keyword, are put in chronologic order (see (b) of FIG. 8).

The controller may further display icons ('>') for retrieving detailed information in the notepads, and upon receiving an input on the icons, may display the detailed information (keywords) contained in the notepads on the touch screen.

Upon receiving an input on the representative keyword for a notepad, the controller may display the detailed information in the notepad on the touch screen.

Referring to FIG. 9, the controller (180 of FIG. 1) may display keywords contained in the notepad of a diary. In this case, a representative keyword ('Tue. October 8') may be displayed at the top of the notepad (see (a) of FIG. 9).

The controller may further display an indicator h1 for a keyword with a history, among the keywords contained in the notepad, and upon receiving an input on the indicator h1, may further display a pop-up for menu items to go to history or content (see (b) of FIG. 9).

Upon receiving a request for retrieving the history displayed in the pop-up, the controller may provide the event information corresponding to the keyword which was previously stored in the diary (see (a) of FIG. 9).

Figure 10:
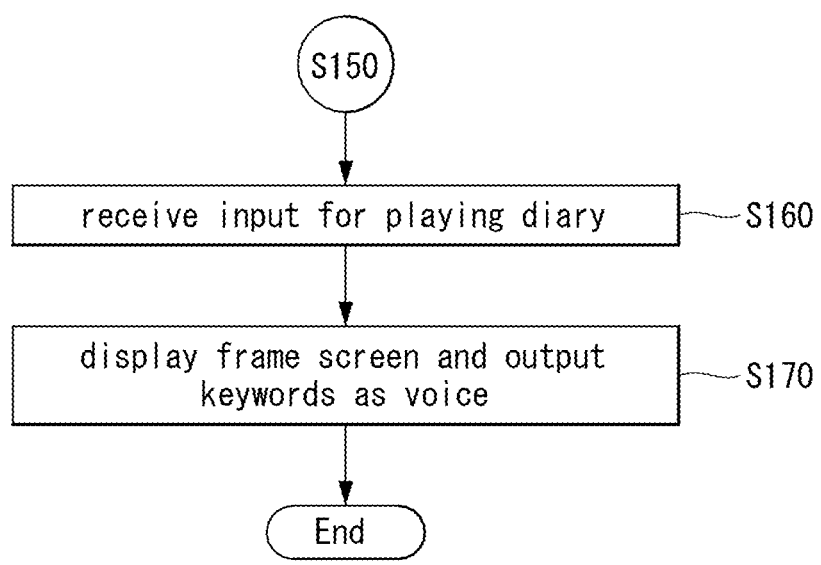
FIG. 10 is a flowchart of a method of displaying the playback screen of a diary in the mobile terminal according to the first embodiment of the present invention.
Figure 11:
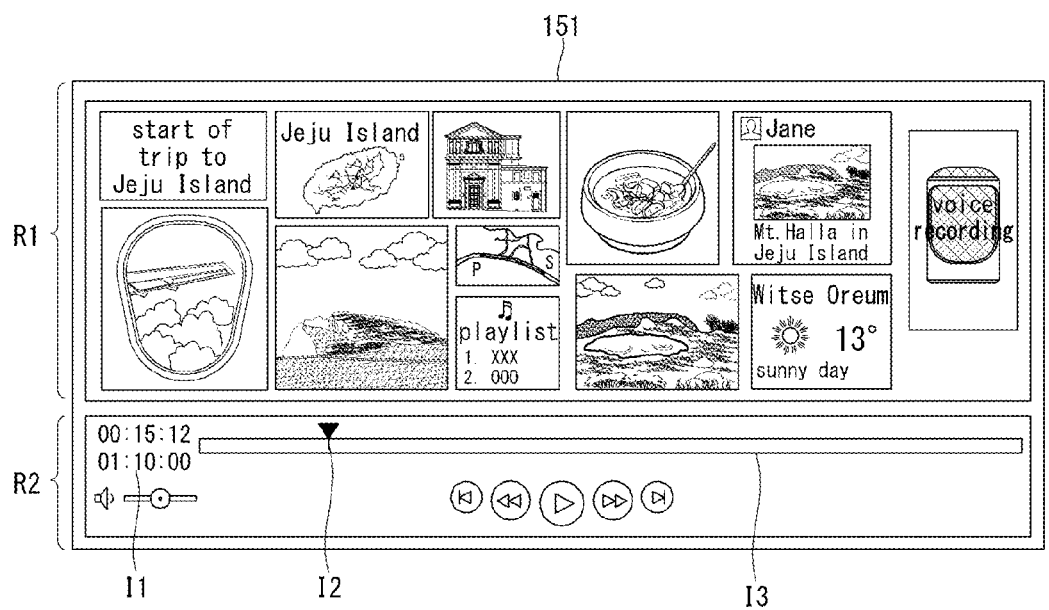
FIG. 11 is a view illustrating the playback screen of the diary in the mobile terminal according to the first embodiment of the present invention.

FIG. 10 is a flowchart of a method of displaying the playback screen of a diary in the mobile terminal according to the first embodiment of the present invention. FIG. 11 is a view illustrating the playback screen of the diary in the mobile terminal according to the first embodiment of the present invention.

Referring to FIG. 10, upon receiving a request for executing (or playing) a created diary (S160), the controller (180 of FIG. 1) may display a frame screen and output keywords as voice (S170).

Referring to FIG. 11, upon receiving a request for playing a created diary, the controller (180 of FIG. 1) may display a frame screen F1 in a first area R1 of a touch screen 151, display a playback navigation bar I3 in a second area R2 of the touch screen 151, and convert the keywords stored in a notepad interfacing with the frame screen F1 into voice and output the voice.

The controller may display the total playback time of the notepad and the current playback position by using indicators I1 and I2 in the playback navigation bar. Upon receiving a drag input on the indicator I2 in the playback navigation bar, the controller may adjust and display the indicator's position on the playback navigation bar in response to the drag input, and output a keyword for the indicator's position as voice. In this case, the controller may display the event information corresponding to the keyword displayed on the frame screen in a different way from other event information.

Upon receiving an input for playing the diary, and if a music playlist is contained in the event information in the diary, the controller may output music in the music playlist as background music while outputting the keywords stored in the notepad as voice.

Figure 12:
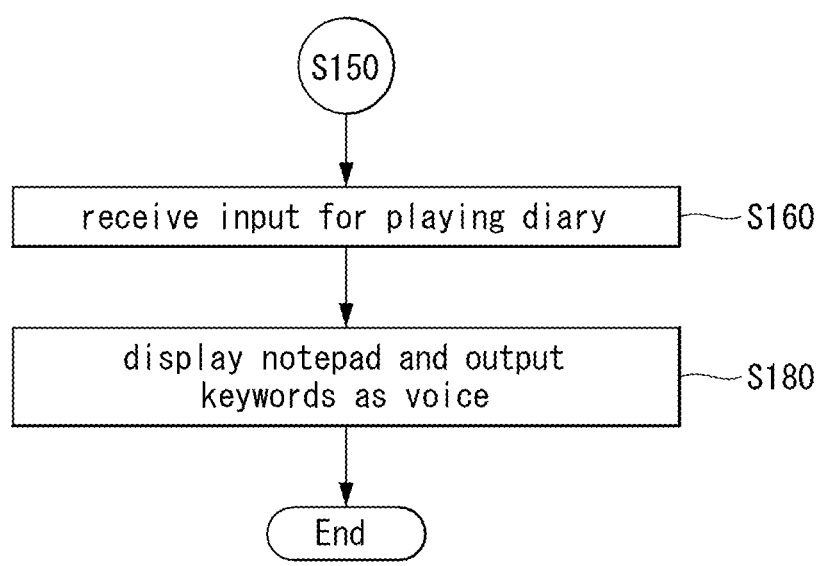
FIG. 12 is a flowchart of a method of displaying the playback screen of a diary in the mobile terminal according to the second embodiment of the present invention.
Figure 13:
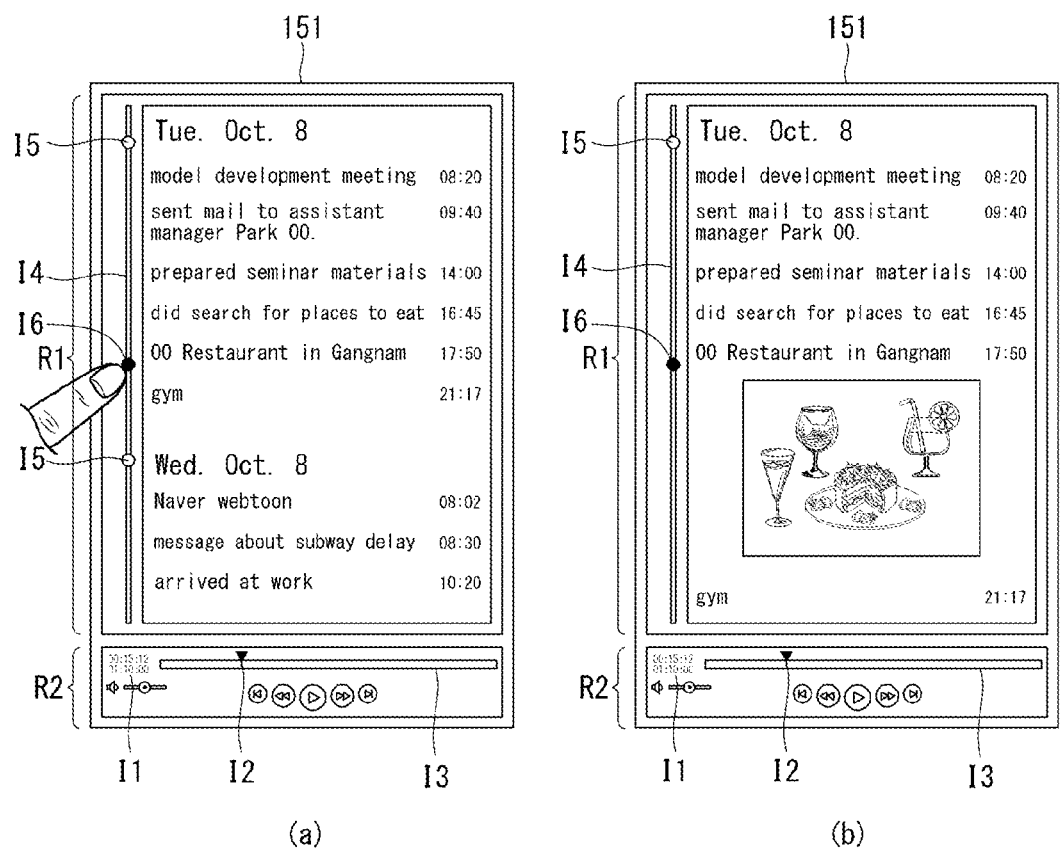
FIGS. 13 and 14 are views illustrating the playback screen of the diary in the mobile terminal according to the second embodiment of the present invention.
Figure 14:
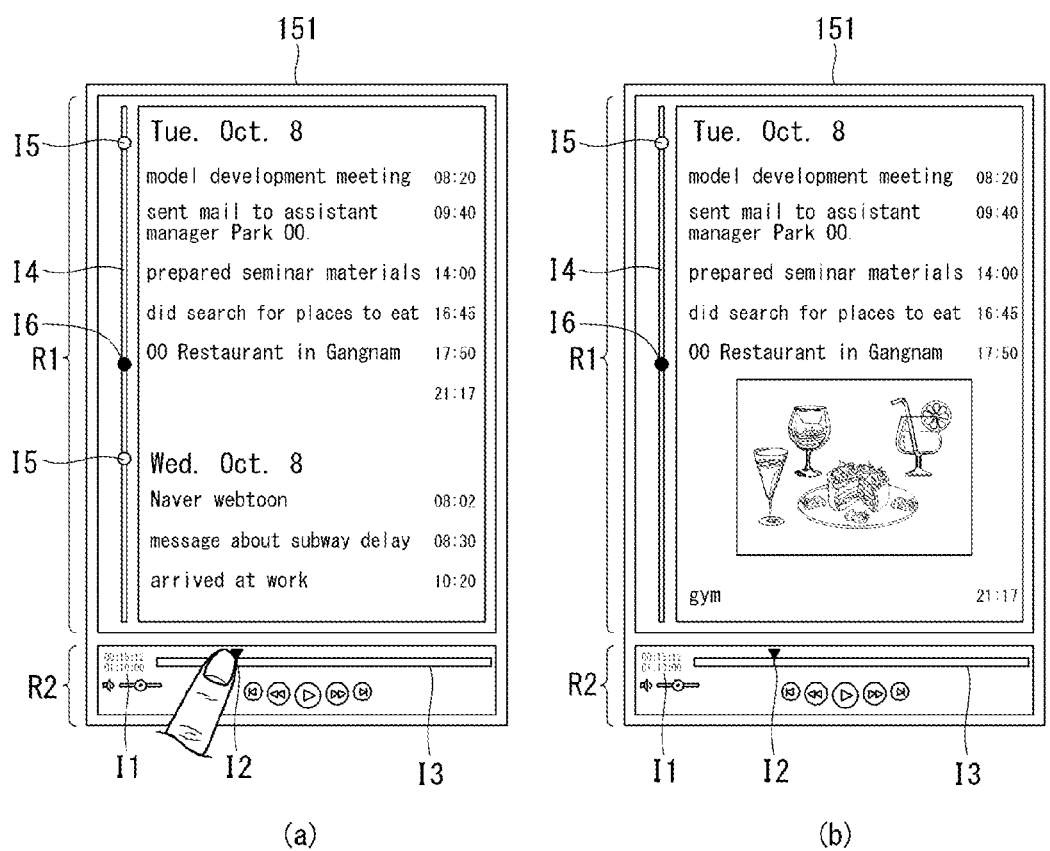

FIG. 12 is a flowchart of a method of displaying the playback screen of a diary in the mobile terminal according to the second embodiment of the present invention. FIGS. 13 and 14 are views illustrating the playback screen of the diary in the mobile terminal according to the second embodiment of the present invention.

Referring to FIG. 12, upon receiving a request for executing a created diary (S160), the controller (180 of FIG. 1) may display a notepad and output keywords as voice (S180).

Referring to FIG. 13, the controller (180 of FIG. 1) may display a notepad in a first area R1 of the touch screen 151, and display a first playback navigation bar I4 on one side of the notepad and a second playback navigation bar I3 in a second area R2 of the touch screen 151.

The first playback navigation bar I4 includes an indicator I5 indicating the position of a representative keyword for the notepad and an indicator I6 indicating the current playback position. The second playback navigation bar I3 may include indicators I1 and I2 indicating the total playback time of the notepad and the current playback position.

Upon receiving an input on the indicator I6 indicating the current playback position on the first playback navigation bar I4, the controller may display detailed information about an event related to the keyword for the current playback position below the keyword. If the input on the indicator I6 indicating the current playback position on the first playback navigation bar I4 is released, the controller may release the display of the detailed information about the event.

Also, upon receiving an input on the indicator I2 indicating the current playback position on the second playback navigation bar I3, the controller may display detailed information about an event related to the keyword for the current playback position on the touch screen. If the input on the indicator indicating the current playback position on the second playback navigation bar I3 is released, the controller may release the display of the detailed information about the event.

The input on the indicator indicating the current playback position may be a long press or a double touch.

Upon receiving a drag input on the indicator I2 indicating the current playback position on the second playback navigation bar I3, the controller may output a keyword for the drag position as voice, and adjust and display the position of the indicator indicating the current playback position on the first playback navigation bar I4.

Figure 15:
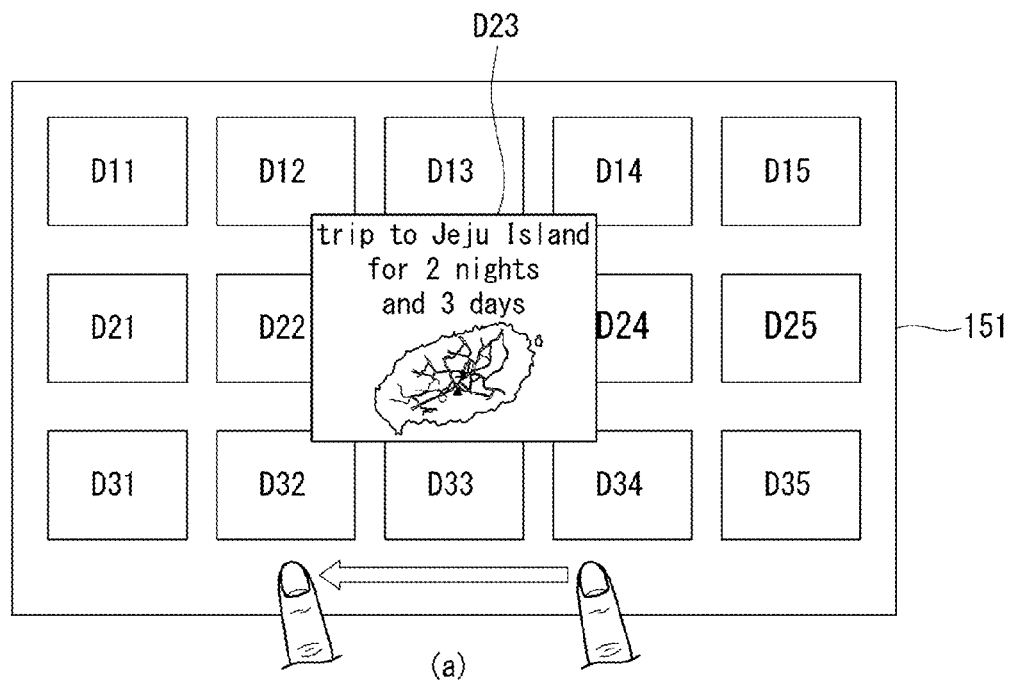
FIGS. 15 to 17 are views for explaining a method of retrieving a diary in a mobile terminal according to one embodiment of the present invention.
Figure 15:
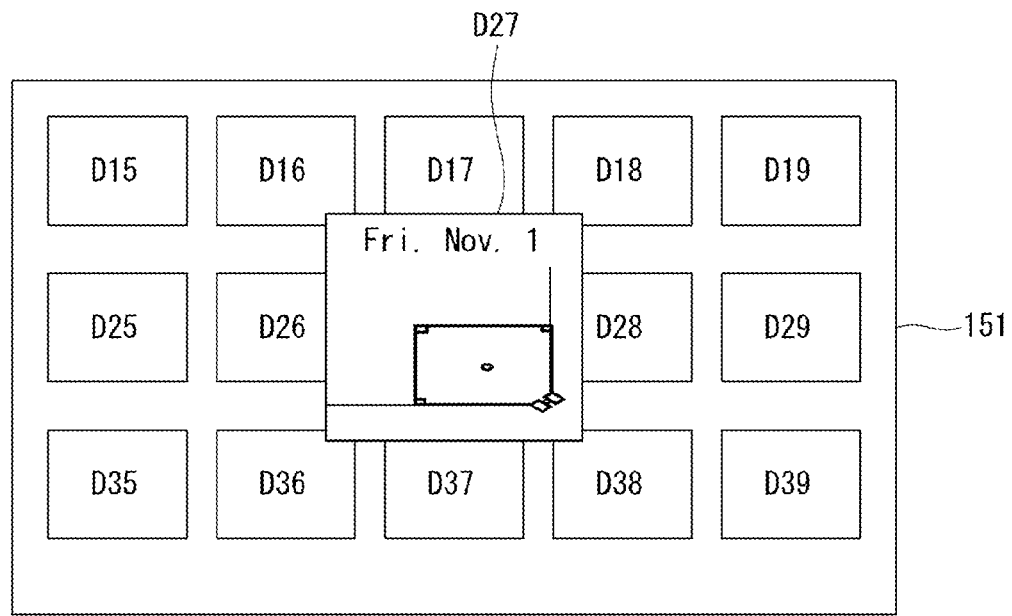
Figure 16:
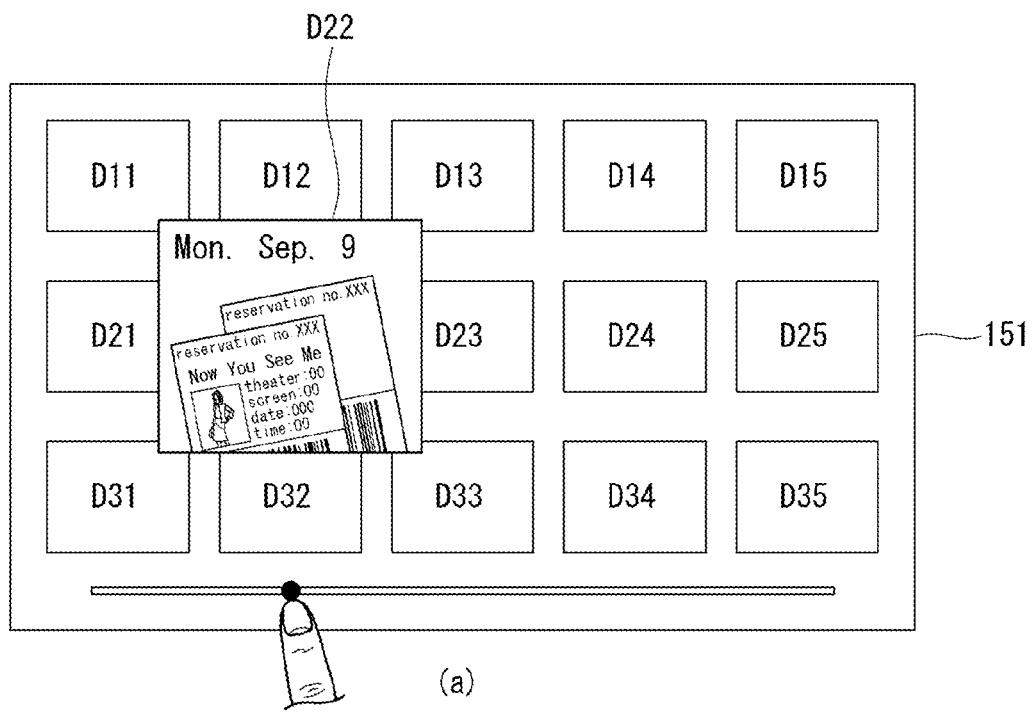
Figure 16:
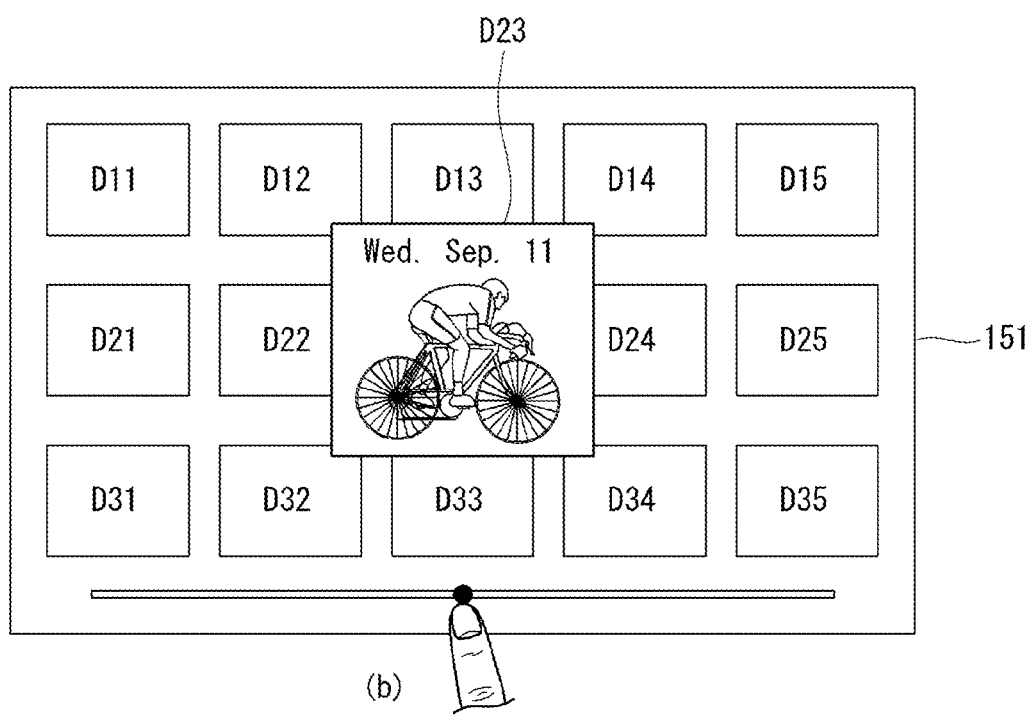
Figure 17:
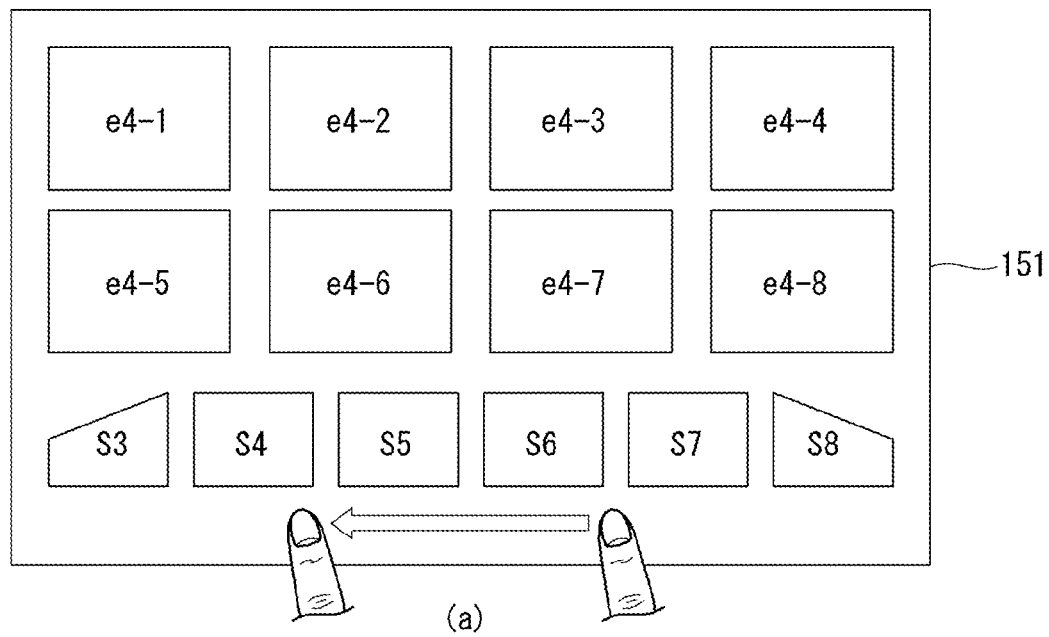
Figure 17:
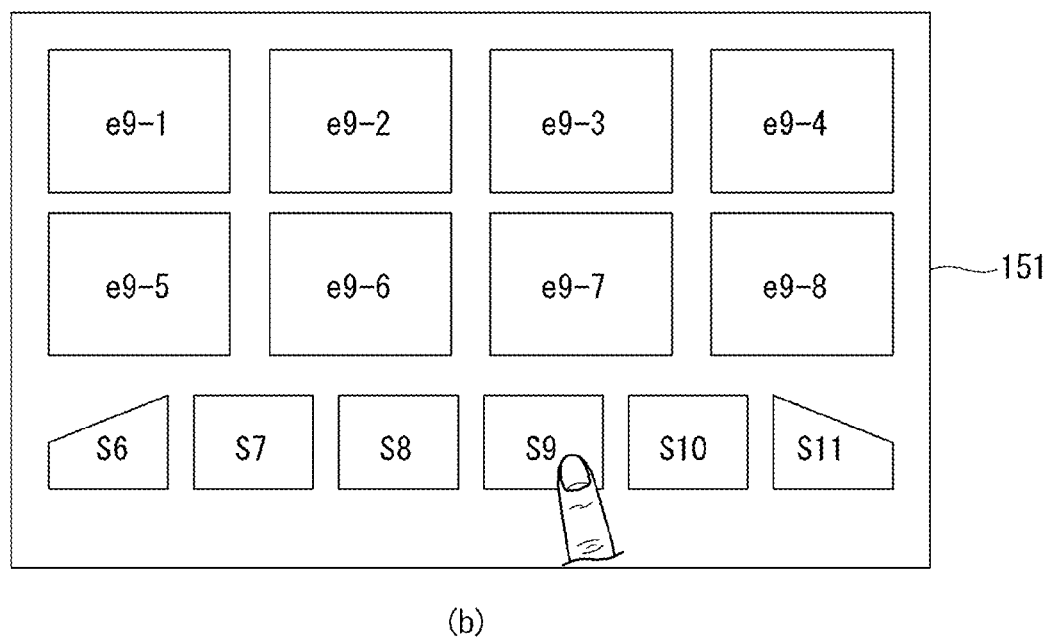

FIGS. 15 to 17 are views for explaining a method of retrieving a diary in a mobile terminal according to one embodiment of the present invention.

A method of creating a plurality of diaries, storing them in a memory, and retrieving a particular one of the stored diaries, in a mobile terminal according to one embodiment of the present invention will be described with reference to FIGS. 15 to 17.

Referring to FIG. FIG. 15, upon receiving a request for retrieving a particular one of a plurality of diaries, the controller (180 of FIG. 1) may display a plurality of stored diaries files D11 to D35 on the touch screen 151.

Specifically, the controller may reduce the stored diary files D11 to D35 to a set size and display them on the touch screen 151, and reposition the diary files displayed in response to a drag input and display them on the touch screen 151.

Also, the controller may render the diary files D23 and D27 located in the center of the touch screen 151 larger than the other diary files.

Referring to FIG. 16, upon receiving a request for retrieving a particular one of a plurality of diaries, the controller (180 of FIG. 1) may display a plurality of stored diary files D11 to D35 and a navigation bar on the touch screen 151.

The controller may change the one to be enlarged, among the plurality of diary files D11 to D35 displayed on the touch screen 151, from D22 to D23 while adjusting the position of the navigation bar.

Accordingly, the user can retrieve a particular diary easily and quickly while viewing the enlarged images of the diary files by scrolling.

Referring to FIG. 17, upon receiving a request for retrieving a particular one of a plurality of diaries, the controller (180 of FIG. 1) may display on the touch screen 151 representative thumbnails S3 to S11 of the diaries and images e4-1 to e4-8 or e9-1 to e9-8 contained in the diary corresponding to a particular representative thumbnail.

The controller may move the representative thumbnails of the diaries in a particular direction in response to a drag input and display them (see (a) of FIG. 17), and upon receiving an input on a particular one of the representative thumbnails (see (b) of FIG. 17), may display the images e9-1 to e9-8 contained in the corresponding diary above the representative thumbnails.

Figure 18:
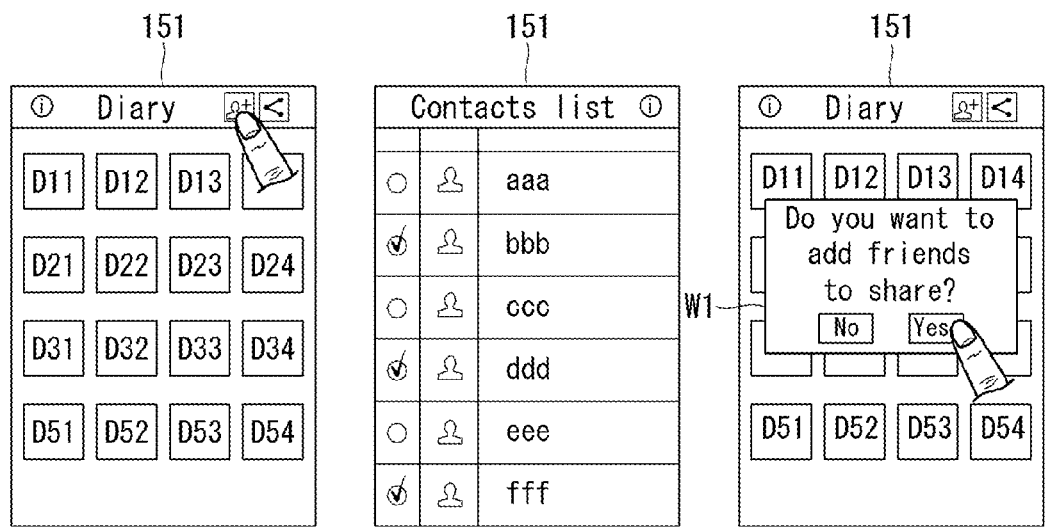
FIGS. 18 to 20 are views for explaining a method of sharing or unsharing diaries in a mobile terminal according to one embodiment of the present invention.
Figure 19:
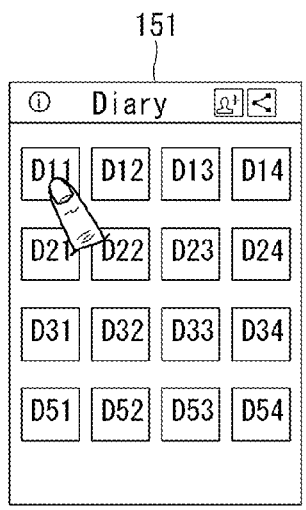
Figure 19:
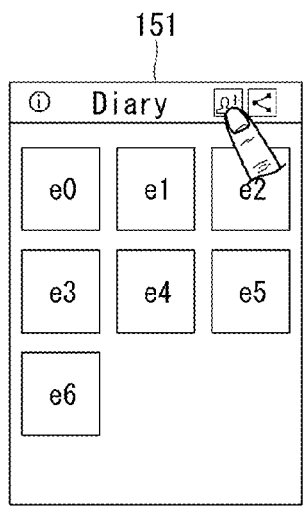
Figure 19:
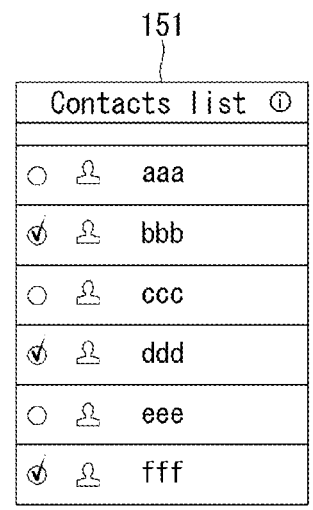
Figure 19:
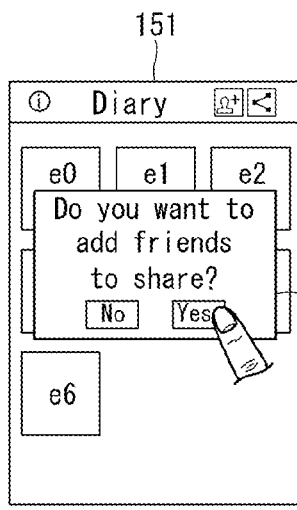
Figure 19:
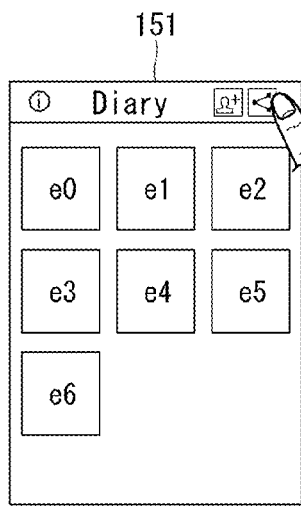
Figure 19:
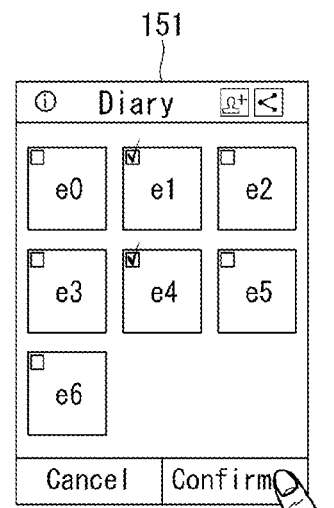
Figure 20:
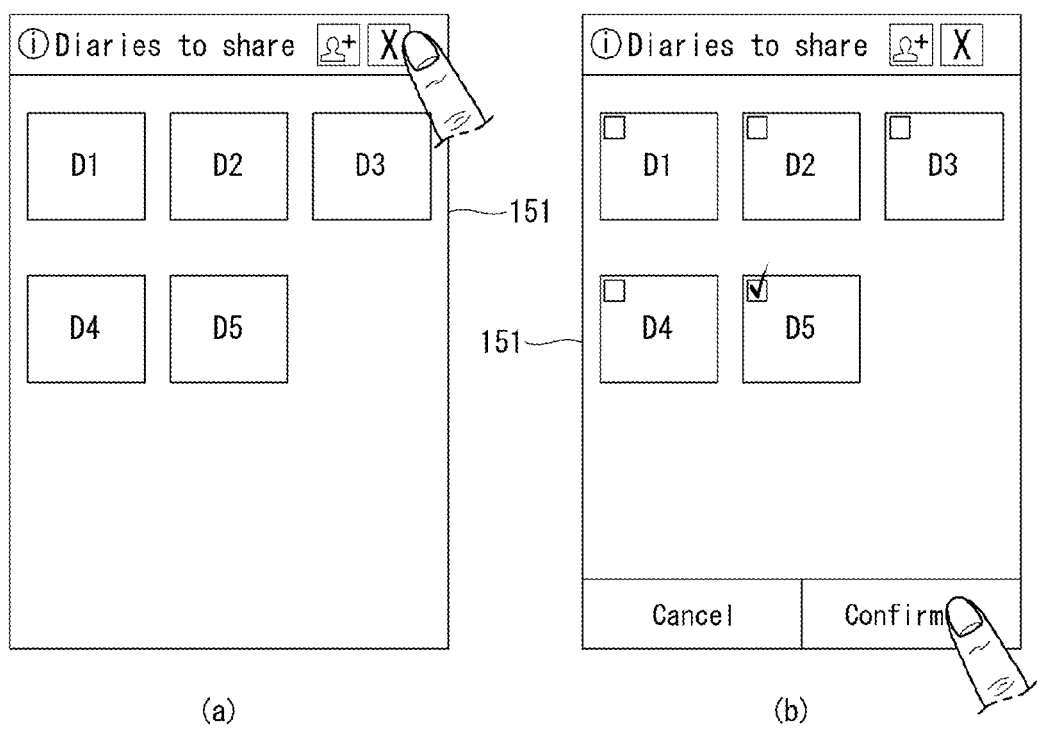

FIGS. 18 to 20 are views for explaining a method of sharing or unsharing diaries in a mobile terminal according to one embodiment of the present invention.

Referring to FIG. 18, the controller (180 of FIG. 1) may create a plurality of diary files D11 to D54 and store them in the memory, and upon receiving an input on the menu icon for sharing (see (a) of FIG. 18), may select people from the contacts list to share (see (b) of FIG. 18) and ask to add them as friends to share the diaries ((c) of FIG. 18).

The controller may display a plurality of diary files D11 to D54, and upon receiving a request for sharing the diaries (see (d) of FIG. 18), may display checkboxes in the diary files D11 to D54, and allow the user to tick the checkboxes and then select the confirm menu (see (e) of FIG. 18).

Referring to FIG. 19, the controller (180 of FIG. 1) may select some of the event information contained in a diary file and ask to share it.

The controller may select a particular one D11 of a plurality of diary files D11 to D54 (see (a) of FIG. 19), and upon receiving an input on the menu icon for sharing, with the event information contained in the particular diary file D11 being displayed (see (b) of FIG. 19), may select people from the contacts list to share (see (c) of FIG. 19) and ask to add them as friends to share the diary (see (d) of FIG. 19).

The controller may display multiple pieces of event information e0 to e6, and upon receiving a request for sharing the diary (see (e) of FIG. 19), may display checkboxes in the multiple pieces of event information e0 to e6, and allow the user to tick the checkboxes and then select the confirm menu (see (f) of FIG. 19).

That is, the entire diary file may be shared, or some of the event information contained in the diary file may be selected and shared.

Referring to FIG. 20, the controller (180 of FIG. 1) may unshare the shared diaries.

Upon receiving an input on the unshare icon on the screen displaying shared diary files D1 to D5 (see (a) of FIG. 20), the controller may display checkboxes in the shared diary files, and unshare the shared diary files by ticking the checkboxes and selecting the confirm menu.

Although not shown, the controller may allow the user to choose to unshare each piece of event information contained in a diary.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a memory;
a touchscreen; and
a controller configured to:
retrieve information related to a plurality of events from the memory, wherein the plurality of events occurred during a defined time period;
identify a representative data item of the retrieved information for each event of the plurality of events;
cause the touchscreen to display a frame screen and a list, wherein the frame screen comprises a plurality of items that respectively correspond to an event of the plurality of events, each item of the plurality of items depicts a representative data item that corresponds to an event of the plurality of events, and the list comprises the representative data items; and
cause the touchscreen to display a first navigation bar aligned in a first direction wherein the first navigation bar corresponds to the displayed list and a second navigation bar aligned in a second direction wherein the second navigation bar corresponds to a total playback time of speech audio corresponding to the representative data items;
wherein the first navigation bar comprises an icon for displaying the retrieved information related to an event corresponding to a representative data item included in the list, and the second navigation bar comprises an indicator indicating a current playback position of the speech audio.

2. The mobile terminal of claim 1, wherein the controller is further configured to:
convert text of the representative data items to speech audio; and
cause the speech audio to be output while the frame screen is displayed.

3. The mobile terminal of claim 2, wherein the controller is further configured to cause a music file of a music playlist to be output while causing the speech audio to be output if the retrieved information comprises the music playlist.

4. The mobile terminal of claim 1, wherein the controller is further configured to:
cause the touchscreen to distinctively display a specific item of the plurality of items, wherein the specific item depicts a representative data item corresponding to the speech audio being output at the current playback position.

5. The mobile terminal of claim 1, wherein the controller is further configured to:
convert text of the representative data items to speech audio; and
cause the speech audio to be output while the list comprising the representative data items is displayed.

6. The mobile terminal of claim 1, wherein the controller is further configured to cause the touchscreen to display retrieved information related to an event corresponding to the speech audio currently being output.

7. The mobile terminal of claim 1, wherein an event of the plurality of events comprises at least:
an incoming phone call;
an incoming message;
an incoming e-mail;
a captured image;
a notification;
a search performed using an application;
an input received to store information;
an input received to enter information; or
a change in location information of the mobile terminal wherein the change exceeds a threshold distance;
wherein the controller is further configured to cause the memory to store information related to each event of the plurality of events comprising the time of the event and the location information of the mobile terminal at the time of the event.

8. The mobile terminal of claim 1, wherein the controller is further configured to:
cause the memory to store the frame screen;
identify a representative image from the retrieved information of the plurality of events;
identify a representative text item from the retrieved information of the plurality of events;
cause the touchscreen to display the representative text item on the representative image; and
cause the memory to store the representative text item and the representative image as a representative thumbnail image of the frame screen.

9. The mobile terminal of claim 8, wherein the controller is further configured to:
cause the touchscreen to display a plurality of representative thumbnail images each in a first size or a plurality of representative file icons each in the first size, representing a plurality of frame screens;
cause the touchscreen to display a representative thumbnail image or a representative file icon located in the center of the touchscreen in a second size larger than the first size; and
move the plurality of representative thumbnail images or the plurality of representative file images in a first direction in response to a scroll input received via the touchscreen.

10. The mobile terminal of claim 9, wherein the controller is further configured to cause the touchscreen to display a representative thumbnail image of the plurality of representative thumbnail images or a representative file icon of the plurality of representative file icons located at a position of the received scroll input in the second size larger than the first size.

11. The mobile terminal of claim 10, further comprising a touchscreen, wherein the controller is further configured to cause the touchscreen to display:
a plurality of representative thumbnail images of a plurality of frame screens in a first area of the touchscreen; and
a preview area displaying retrieved information related to an event corresponding to an item of the plurality of items corresponding to a particular frame screen of the plurality of frame screens in a second area of the touchscreen.

12. The mobile terminal of claim 1, wherein the controller is further configured to cause the touchscreen to display:
an indicator corresponding to a specific representative data item when stored history information related to the specific representative data item exists in the memory; and
a pop-up dialog comprising the history information in response to an input received on the indicator via the touchscreen.

13. The mobile terminal of claim 1, wherein the controller is further configured to cause the touchscreen to display the plurality of items on the frame screen in chronological order.

14. A control method of a mobile terminal, the control method comprising:

retrieving information related to a plurality of events, wherein the plurality of events occurred during a defined time period;

identifying a representative data item of the information for each event of the plurality of events;

displaying via a touchscreen a frame screen and a list, wherein the frame screen comprises a plurality of items that respectively correspond to an event of the plurality of events, wherein each item of the plurality of items depicts a representative data item that corresponds to an event of the plurality of events, and the list comprises the representative data items; and displaying a first navigation bar aligned in a first direction wherein the first navigation bar corresponds to the displayed list and a second navigation bar aligned in a second direction wherein the second navigation bar corresponds to a total playback time of speech audio corresponding to the representative data items;

wherein the first navigation bar comprises at least one icon for displaying the retrieved information related to an event corresponding to a representative data item included in the list and the second navigation bar comprises an indicator indicating a current playback position of the speech audio.

15. The control method of claim 14, further comprising:
converting text of the representative data items to speech audio; and
outputting the speech audio while displaying the frame screen.

16. The control method of claim 14, further comprising:
converting text of the representative data items to speech audio; and
outputting the speech audio while displaying the list.

17. The control method of claim 16, further comprising displaying the retrieved information related to an event corresponding to the speech audio currently being output.

18. The mobile terminal of claim 14, further comprising:
storing the frame screen via a memory;
identifying a representative image from the retrieved information of the plurality of events;
identifying a representative text item from the retrieved information of the plurality of events;
displaying via the touchscreen the representative text item on the representative image; and
storing via the memory the representative text item and the representative image as a representative thumbnail image of the frame screen.

\* \* \* \* \*